US007620996B2

(12) United States Patent
Torres et al.

(10) Patent No.: US 7,620,996 B2
(45) Date of Patent: Nov. 17, 2009

(54) DYNAMIC SUMMARY MODULE

(75) Inventors: Michael I. Torres, Seattle, WA (US);
Stephen P. Rosato, Woodinville, WA (US); Jason C. Fluegel, Seattle, WA (US); Thomas A. Jeyaseelan, Kirkland, WA (US); DeEtte M. Day, Seattle, WA (US); Eyal Z. Axelrod, Redmond, WA (US); German A. Gil, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 10/978,993

(22) Filed: Nov. 1, 2004

(65) Prior Publication Data
US 2006/0095976 A1 May 4, 2006

(51) Int. Cl.
G06F 7/04 (2006.01)
G06F 17/30 (2006.01)
H04N 7/16 (2006.01)

(52) U.S. Cl. ...................................................... 726/28
(58) Field of Classification Search .................... 726/28
See application file for complete search history.

(56) References Cited

U.S. PATENT DOCUMENTS

| 6,065,044 | A | | 5/2000 | Ogasawara | |
|---|---|---|---|---|---|
| 6,094,681 | A | * | 7/2000 | Shaffer et al. | 709/224 |
| 6,269,369 | B1 | * | 7/2001 | Robertson | 707/10 |
| 6,633,910 | B1 | * | 10/2003 | Rajan et al. | 709/224 |
| 6,699,125 | B2 | * | 3/2004 | Kirmse et al. | 463/42 |
| 6,711,579 | B2 | * | 3/2004 | Balakrishnan | 707/102 |
| 6,862,572 | B1 | * | 3/2005 | de Sylva | 705/7 |
| 7,054,886 | B2 | * | 5/2006 | Stern et al. | 707/104.1 |
| 7,085,994 | B2 | * | 8/2006 | Gvily | 715/234 |
| 7,177,909 | B2 | * | 2/2007 | Stark et al. | 709/206 |
| 7,188,153 | B2 | * | 3/2007 | Lunt et al. | 709/218 |
| 7,262,772 | B2 | * | 8/2007 | Ebert | 345/440 |
| 7,269,590 | B2 | * | 9/2007 | Hull et al. | 707/10 |
| 7,299,196 | B2 | * | 11/2007 | Lee | 705/26 |
| 7,325,202 | B2 | * | 1/2008 | Shirriff | 715/742 |
| 7,359,943 | B2 | * | 4/2008 | Szeto et al. | 709/206 |
| 7,369,279 | B2 | * | 5/2008 | Van Oosterhout | 358/3.28 |

(Continued)

FOREIGN PATENT DOCUMENTS

WO    WO 03/034280 A1    4/2003

OTHER PUBLICATIONS

Office Action dated Apr. 28, 2008, U.S. Appl. No. 10/978,558, filed Nov. 1, 2004.

(Continued)

*Primary Examiner*—David García Cervetti
(74) *Attorney, Agent, or Firm*—Vierra Magen Marcus & DeNiro LLP

(57) ABSTRACT

A content page is configured by a user and located on a network. Changes made to the content page are automatically communicated with notifications to a group of contacts for the user. Only contacts with permission to view the content page, or the changed content, will receive the notification and have permission to view the changes. A visual indicator notifies contacts that a content page of one of their contacts has been changed. When the visual indicator or some other contact indicator is selected by the user, a summary module can be provided. The summary module is a portal to network content, including the content page.

32 Claims, 19 Drawing Sheets

U.S. PATENT DOCUMENTS

| | | | |
|---|---|---|---|
| 7,409,710 B1* | 8/2008 | Uchil et al. | 726/19 |
| 7,433,832 B1* | 10/2008 | Bezos et al. | 705/26 |
| 2002/0004402 A1 | 1/2002 | Suzuki | |
| 2002/0005867 A1* | 1/2002 | Gvily | 345/760 |
| 2002/0010653 A1* | 1/2002 | Lee | 705/26 |
| 2002/0016857 A1 | 2/2002 | Harari | |
| 2002/0059457 A1* | 5/2002 | Ballard et al. | 709/246 |
| 2002/0082892 A1* | 6/2002 | Raffel et al. | 705/8 |
| 2002/0086732 A1* | 7/2002 | Kirmse et al. | 463/42 |
| 2002/0143932 A1* | 10/2002 | Quintero et al. | 709/224 |
| 2003/0046311 A1* | 3/2003 | Baidya et al. | 707/200 |
| 2003/0061463 A1* | 3/2003 | Tibbetts | 712/1 |
| 2003/0110167 A1* | 6/2003 | Kim | 707/4 |
| 2003/0110467 A1* | 6/2003 | Balakrishnan | 717/104 |
| 2003/0115481 A1* | 6/2003 | Baird et al. | 713/201 |
| 2003/0140103 A1* | 7/2003 | Szeto et al. | 709/206 |
| 2003/0163519 A1 | 8/2003 | Kegel et al. | |
| 2003/0208471 A1* | 11/2003 | Kirshenbaum | 707/1 |
| 2004/0030741 A1* | 2/2004 | Wolton et al. | 709/202 |
| 2004/0052356 A1* | 3/2004 | McKinzie et al. | 379/355.02 |
| 2004/0064446 A1* | 4/2004 | Fujimura | 707/3 |
| 2004/0117373 A1* | 6/2004 | Yeung et al. | 707/9 |
| 2004/0128151 A1* | 7/2004 | Mock et al. | 705/1 |
| 2004/0152477 A1* | 8/2004 | Wu et al. | 455/466 |
| 2004/0183815 A1* | 9/2004 | Ebert | 345/619 |
| 2005/0027382 A1* | 2/2005 | Kirmse et al. | 700/91 |
| 2005/0044152 A1* | 2/2005 | Hardy et al. | 709/206 |
| 2005/0091272 A1 | 4/2005 | Smith et al. | |
| 2005/0216563 A1 | 9/2005 | Stewart et al. | |
| 2005/0289470 A1* | 12/2005 | Pabla et al. | 715/751 |
| 2006/0031282 A1* | 2/2006 | Tuttle et al. | 709/203 |
| 2006/0069727 A1 | 3/2006 | Fuller et al. | |
| 2006/0230061 A1 | 10/2006 | Sample et al. | |
| 2007/0011258 A1* | 1/2007 | Khoo | 709/206 |
| 2008/0005247 A9* | 1/2008 | Khoo | 709/206 |
| 2008/0040436 A1* | 2/2008 | Setlur et al. | 709/206 |
| 2008/0091786 A1 | 4/2008 | Jhanji et al. | |
| 2008/0140779 A1* | 6/2008 | Ahn et al. | 709/205 |
| 2008/0171601 A1* | 7/2008 | Kirmse et al. | 463/42 |
| 2008/0172606 A1* | 7/2008 | White | 715/254 |
| 2009/0049306 A1* | 2/2009 | Dharmarajan | 713/183 |

OTHER PUBLICATIONS

Amendment filed Jul. 8, 2008, U.S. Appl. No. 10/978,558, filed Nov. 1, 2004.
Office Action mailed Jan. 13, 2009, U.S. Appl. No. 10/978,558, filed Nov. 1, 2004.
Office Action dated Oct. 10, 2008, U.S. Appl. No. 10/978,558, filed Nov. 1, 2004.
Mexican Office Action dated Aug. 15, 2008, Mexican Patent Appl. No. PA/a/2005/011615 filed Oct. 28, 2005.
Response to Office Action dated Nov. 18, 2008, U.S. Appl. No. 10/978,558, filed Nov. 1, 2004.
Response to Office Action filed Apr. 13, 2009 in U.S. Appl. No. 10/978,558.
Office Action dated Jul. 17, 2009 in U.S. Appl. No. 10/978,558.

* cited by examiner

280

290

DYNAMIC SUMMARY MODULE

CROSS REFERENCE TO RELATED INVENTION

The instant non-provisional application is related to the following patent application, which is hereby incorporated by reference in their entirety:

U.S. patent application Ser. No. 10/978,558, filed the same day as the present application, entitled "Dynamic Content Change Notification", having inventors Michael I, Torres, Steve P. Rosato, Jason C. Fluegel, Thomas A. Jeyaseelan, DeEtte M. Day, Eyal Z. Axelrod and German A. Gil.

BACKGROUND OF THE INVENTION

1. Field of the Invention

The present invention is directed to dynamically providing notifications and related content over a network.

2. Description of the Related Art

With the development of the Internet, several tools have evolved that allow people to communicate with each other. These tools allow people to express their thoughts, organize data, share experiences, and provide content to others with access to the web.

The tools for communicating over the web include digital contact cards and web pages. A digital contact card, or contact card, is an image containing contact information for a person or entity. Contact cards typically contain the same contact information as paper business cards, including name, title, company, phone number, fax number email and address against a plain background. The cards are typically distributed through email messages that contain a link to the card. After receiving the email, opening the email, and clicking on the contact card link, the viewer may see the information on the card. If the contact information or other information changes for the card owner, the card owner must manually change the information. This provides very plain, common and conservative representation of the card owner.

Web pages are among the most popular communication tools for the web. Web pages are commonly used to post personal content to the Internet. A web page can include formatted text, weblogs, images, photographs and links to other web pages. An owner may personalize a web page by configuring the content, formatting, backgrounds, fonts, colors, and other design elements. A web browser running on a local machine requests a given web page from a web server over the Internet, loads the page to the local machine, and interprets a dynamic or static web page to provide the page to user. An owner may make changes to the pages by adding, removing or changing content. Viewers may see the changes made by the owner the next time they visit the page.

There is no convenient mechanism for automatically publishing changes to web site content or the changes themselves to a trusted list of contacts. To provide notification of changes in a web page, the owner of a web page must manually notify viewers (for example, with a group email or word of mouth). Further, content on a web page is typically published for all to view. This discourages a web site owner from posting content that may not be suitable for everyone to see. Though certain Internet pages are password protected, users without the password are prevented from viewing any of the content. Owners of password protected content are required to provide or assist viewers in obtaining a password.

Prior web services, such as blog, photo sharing and instant messaging (IM) web services, have attempted to provide some type of notification process. A typical blog is a single page of entries from the blog owner. Entry content is usually text, but may include photographs and links to other content. The entries are usually a stream-of-consciousness or "thought of the day", in reverse chronological order. Viewers can post comments in response to a particular entry, which are usually viewed on a separate page. Blogs are similar to websites in that they are available for all to see, but they can be implemented with passwords. Some prior blog systems provide for an email notification to a distribution list when a new entry is posted, and there are also systems available that can be integrated into existing blog applications to enable this functionality. However, the recipients are typically added to the distribution list by request of the recipient to the hosting web server, not by owner invitation. Often times, a blog owner will have complete strangers on the notification list for his blog. This provides for distribution of new blog entries to viewers that have no trust relationship with the owner. Further, the information provided is typically a link in an email address. Thus, to retrieve the information, a user must log-on to the email address, access their inbox, open the mail message, and click on the link.

Photo sharing web services allow users to upload, share, and order prints of digital photos. Sharing the photos requires generating a list of recipients to share the photos with and requesting the web service send an email notification to the list. This can be a tedious process each time a new set of photos is uploaded. The uploaded photos are not available to anyone not on the recipient list.

IM applications allow logged-in users to send text messages and other content to each other instantaneously. Each user may maintain a list of contacts that he wishes to interact with. One can "chat" with any of the contacts in their list, often called a buddy list, as long as that contact is signed into a network. Some IM applications are integrated with a web-based email service. When a user has an account with the integrated email service and is logged on to the IM, a notification can be provided through the IM when a new email is received at an email server.

Prior Internet communication tools do not provide for automatic notification of content changes to a trusted group of contacts or sufficiently provide for controlled access to content in a convenient manner.

SUMMARY OF THE INVENTION

The technology herein, roughly described, pertains to providing notifications and content summaries over a network. A content page owner configures the content page on a network. The owner may configure the content page content however he wishes. When changes are made to the content page, notifications are automatically generated and routed to a group of existing contacts that have a trust relationship with the owner. Only contacts with permission to view the content page, or the particular changed content, will receive the notification and be able to view the changes.

A visual indicator in a user interface notifies users that a content page or a subsection of the page (component) owned by one of his contacts has changed. When the visual indicator is selected by the user, a summary module can be provided. The summary module is a portal to network content. The network content may include content pages on the Internet and other content. The summary module content is configured by the owner of the content page. When used with a content page, the summary module can be generated directly from the content page.

A notification can be provided by detecting a content change in a content page, automatically generating a notification associated with the content change, automatically transmitting the notification to a messenger server, and displaying a visual indicator associated with the notification on a messenger user interface, the visual indicator associated with the content change.

A dynamic summary module can be used to publish content selected by user. The summary module content can be located over a network, including a content page. When used with a content page, the summary module is automatically updated when the content page changes are detected.

A system for providing a notification over a network can include one or more servers, the one or more servers including content pages, one or more databases connected to one or more servers, the one or more databases including one or more user lists and one or more contact lists, and a messenger server connected to one or more servers and one or more databases, wherein the messenger server is configured to provide a notification to one or more contacts, the notification associated with content from the content pages.

BRIEF DESCRIPTION OF THE DRAWINGS

FIG. 12 illustrates one embodiment a method for of determining a source to retrieve summary module data from.

DETAILED DESCRIPTION

A content page is an organized dynamic collection of content located on a network. The content page may include one or more components. In one embodiment, content page components may include content such as a blog, photo album, music list, network link list, contact information, calendar, profile information, polls, message boards, video, web cams, and guest books. Other content can be implemented on the content page as well. In one embodiment, a content page is a web site and accessible over the Internet. In this case, an owner of the content page can configure and access the content page regardless of the owner's location.

In one embodiment, a content page may include portions from other content pages. For example, a collection of blogs, images, songs and other content from other content pages may be added to the owner's content page. As a result, the owner can visit his own content page to see changes in the content of other content pages.

Content page content may be configured with different fonts, colors and styles to create a customized look and feel. Personalized content can also be used to configure a content page, including a personal message or quote, a personalized thumbnail, name and contact information, and contact links to instant messaging services or email. The personal message or quote can be any message of text, images, video or other content that the owner wishes to display on his page. The thumbnail can be a photo image of the person, an avatar, or some other image selected by the owner. The content page can be configured and changed at any time by an the owner of the content page.

Figure 1:
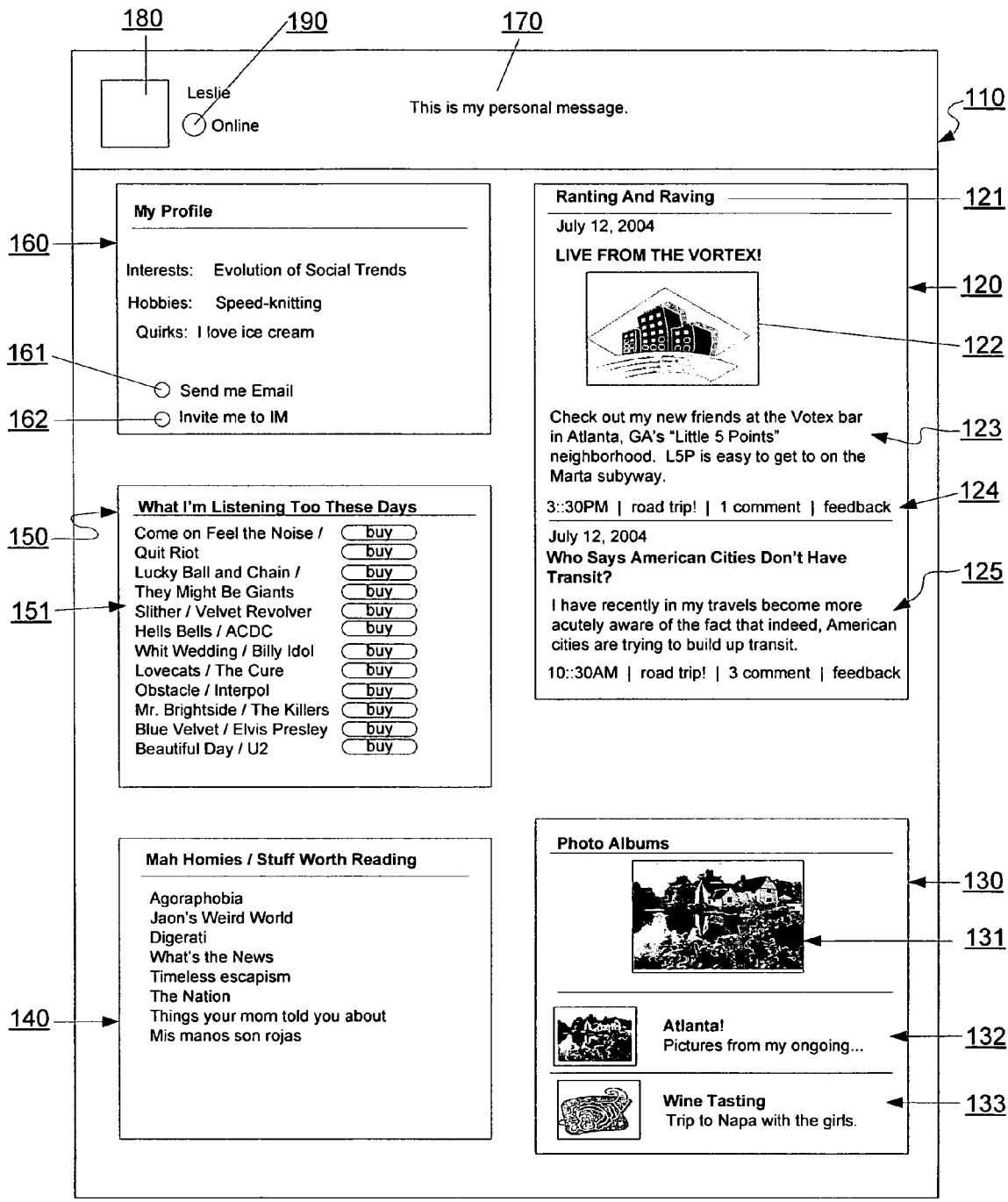
FIG. 1 illustrates one embodiment of content page.

FIG. 1 illustrates one embodiment of a content page 100. Content page 100 includes blog component 120, photo album component 130 below blog component 120, links component 140 next to photo album component 130, music component 150 above links component 140, profile component 160 above the music component 150, personal message 170 above components 120-170, personal image 180 above profile component 160 and online indicator 190 next to the personal image 180, all contained in user interface window 110. Blog 120 includes an entry title 121, an entry image 122 below the entry title 121, a first blog entry 123 below the entry image 122, and a blog toolbar 124 below the blog entry 123. Below blog toolbar 124 is a second blog entry 125. Second blog entry 125 is below first blog entry 123, indicating it was posted earlier than the more recent blog entry 123. Photo album component 130 includes image 131, first photo album portion 132, and second photo album portion 133. First album portion 132 and second album portion 133 each represent a separate album and contain a representative thumbnail, an album title and an album description. Image 131 is the representative image from most recent album 132. Links component 140 includes a list of links to other web sites selected by the owner of the content page. Music component 150 includes a list 151 of song titles and artists selected or recently played by the owner. A buy button is located next to each song in the list. The button is a link to a web service from which a viewer can purchase the particular song. Profile component 160 includes an email link 16, IM link 162, and text indicating the content page owner's interests, hobbies and quirks. The owner can add categories to the profile components. Personal image 180 is an image that the owner can choose from or provide. Online indicator 190 indicates whether the owner is currently logged on to a network in communication with the content page.

Content page 100 is merely an example of one content page configuration. The spirit of a content page is that the content page owner can customize the appearance and experience of the content page to reflect their personal taste. Other configurations are possible, including those having different module titles, content, orientation, and look-and-feel features than that illustrated in FIG. 1.

In one embodiment, the content of a content page and other pages located on a network can be shared using a summary module. A summary module is an interface used to publish information selected by an owner by providing a portal to the owner's content page. The information may include profile information, communication links, and other content located over a network, such as the content of a content page. The profile information may include name, address, phone number and other information for the owner. The communication links can include email, IM links, and other links to communicate with the owner. The summary module content may include weather or news from the owner's location, recent news articles regarding the owner's business, scheduling information, whether the content page owner is signed in to network or server, or other information provided over a network. In one embodiment, the summary module includes a subset (or summary) of information from the owner's full content page.

Figure 2A:
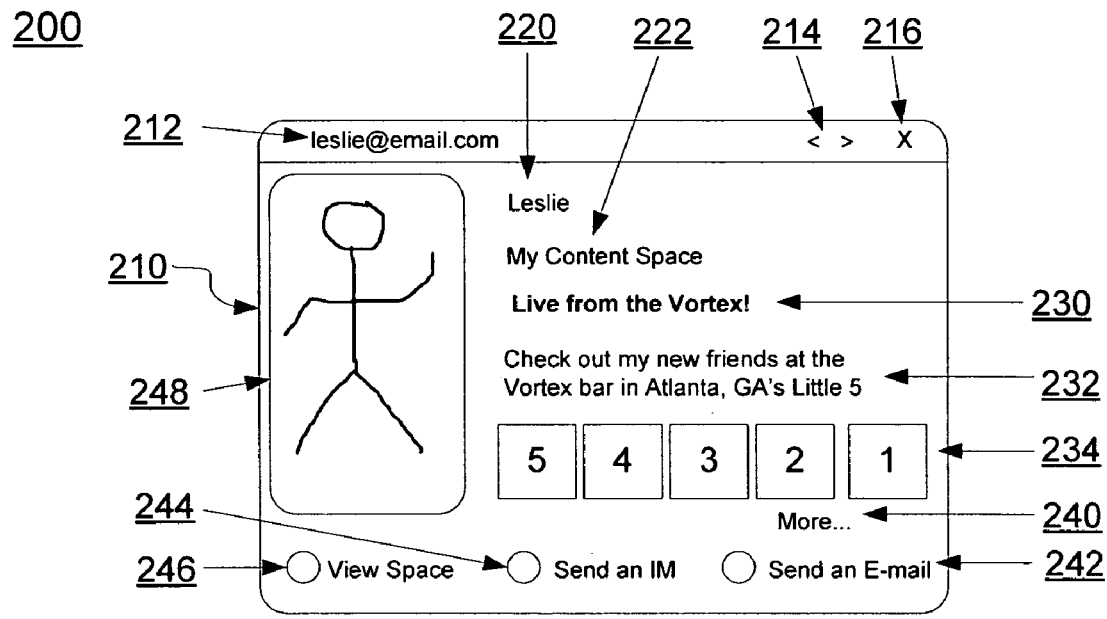
FIG. 2A illustrates one embodiment of a front image of a summary module.
Figure 2B:
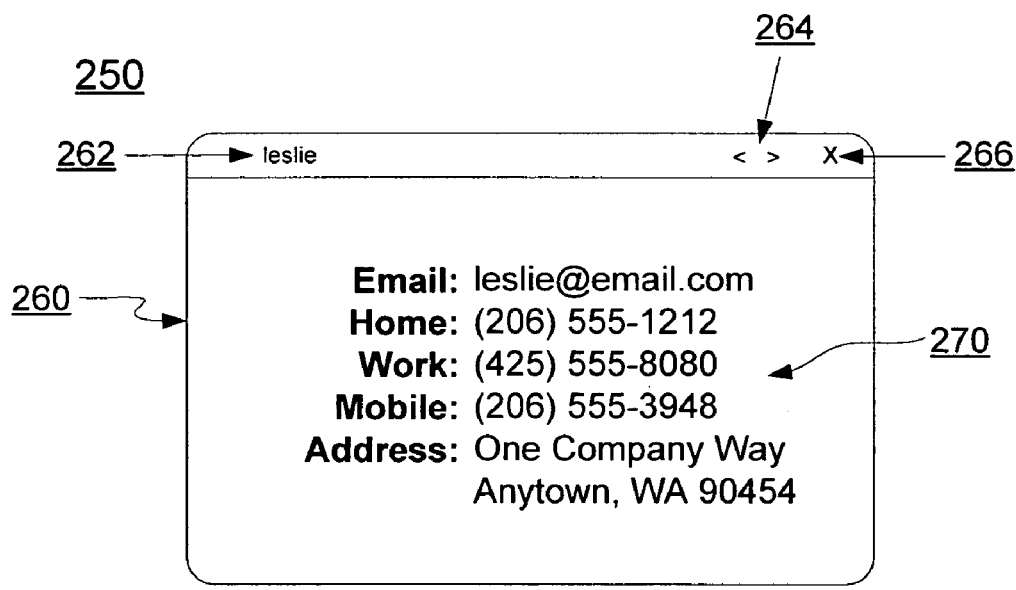
FIG. 2B illustrates one embodiment of a back image of a summary module.

One embodiment of a summary module is illustrated in FIGS. 2A-2B. FIG. 2A illustrates a front image 200 of a summary module and FIG. 2B illustrates a back image 250 of the summary module. Front image 200 includes card 210, user identifier 212, card flip indicator 214, card close icon 216, nickname 220, content title 222, photo album title 230, photo album description 232, thumbnails 234, additional content link 240, email link 242, IM link 244, content page link 246, and profile image 248. User identifier 212 may be a name or email that uniquely identifies an owner over the network containing the owner's content page. When the card flip indicator 214 is selected, the front image of the card is-removed and the back image 250 of FIG. 2B is displayed to a user. Nickname 220 is a string of text. Content title 222 is the source of content displayed by the summary module. In the embodiment of FIG. 2A, the content source is the content page of the owner, and each item in the summary module can be found in that content page.

The summary module content items 130-134 corresponds to photo module 120 of content page 100 illustrated in FIG. 1. Photo album title 230, photo album description 232 and thumbnails 234 are retrieved from the owner's content page. The additional content link 240 is a link to the URL of the owner's content page. Email link 242 prepares an email to the owner when selected. IM link 244 initiates an IM session with the owner. If the owner is not online when IM link 244 is selected, a viewer can send the owner an offline message. In some embodiments, when the owner is offline, a message is displayed indicating the owner is not available and no offline message is sent. Link 246 retrieves and opens the content page in a new window. Profile image 248 may be a tile, avatar, or any other image the owner may select to include in a profile.

Back image 250 of FIG. 2B includes summary card 260, summary card flip indicator 264, summary card close icon 266, and contact information 270. Back image 250 illustrates the contact information for the owner in a more formal manner than that of front image 200.

In one embodiment, a summary module can indicate that content from an associated content page is changed. A notification process dynamically and automatically incorporates the content page changes in the summary module. The notification process is discussed in more detail below. When a change occurs to a content page associated with a summary module, a visual indicator is provided on the summary module. The visual indicator may include a highlight, a marker, or some other indicator that may or may not correspond to the changed content. In some embodiments, there will be a visual indicator that corresponds to each new item. In other embodiments, the summary module will only have one potential visual indicator, regardless of what data is new.

Figure 2C:
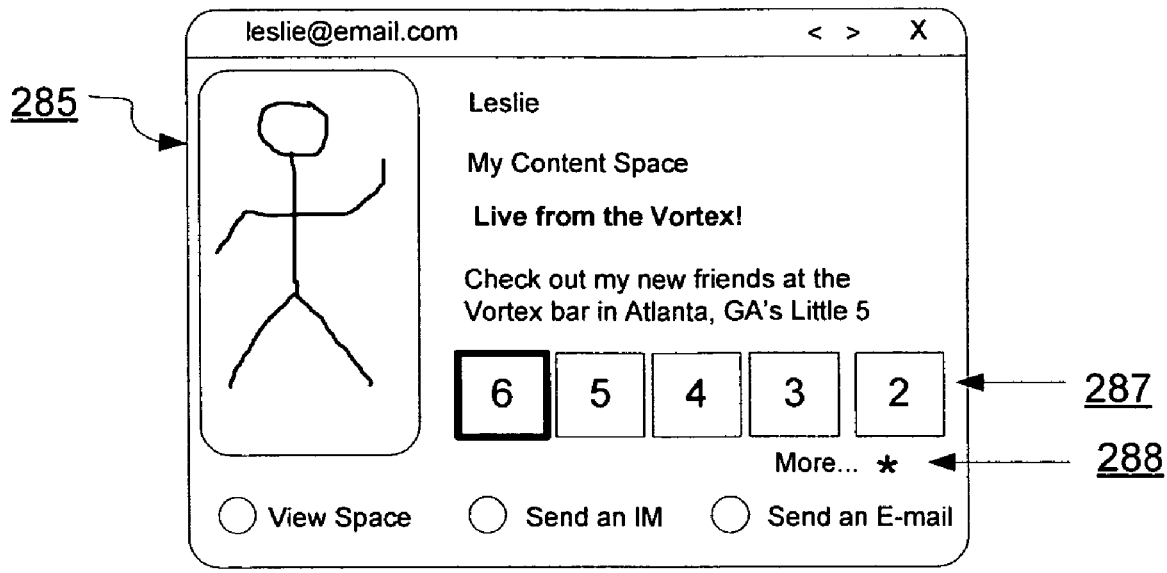
FIG. 2C illustrates one embodiment of a front image of a summary module having a visual indicator.
Figure 2D:
FIG. 2D illustrates one embodiment of a back image of a summary module having a visual indicator.

FIGS. 2C-2D illustrate an embodiment of a summary module with a visual indicator representing a change to a content page. FIG. 2C illustrates one embodiment of a front view 280 of a summary module having one or more visual indicators. FIG. 2C includes summary module 285, thumbnail row 287 and more content indicator 288. The thumbnails 234 of summary module 210 of FIG. 2A included content of 1, 2, 3, 4 and 5. The numbers indicate the order the photos were added to a corresponding content page. The "1" thumbnail was added first, and the "5" thumbnail was added most recently. The thumbnails shift from left to right on the summary module as new ones are added. The thumbnails on card 285 include content of 2, 3, 4, 5 and 6. The new thumbnail "6" is added to the row of thumbnails. All existing thumbnails are shifted to the right, with thumbnail "1" being shifted off the card. The "6" thumbnail is also highlighted with a border indicating that it is new. Summary module 285 also includes icon 288 (an asterisk "*") next to the "more . . . " link. Icon 288 indicates that new content was added to the content page and is accessible by selecting the associated link. In one embodiment, selecting any item on the summary module will cause the user to be taken to the content page associated with the summary module. FIG. 2D includes back image 290 of summary module 295. Summary module 295 includes contact information 297. A visual indicator 298 (an asterisk "*") next to the mobile phone entry indicates that this data item has changed since the last viewing of the summary module. These are examples of how a summary module can indicate that new content was added to a content page.

In one embodiment, the owner of a content page determines what content from the content page is provided on the corresponding summary module for the owner. Thus, although a change may be made to the content page, the summary module can be configured only to provide content from selected modules of the content page. Modules to be included in a summary module can be selected manually by the content page owner, by algorithm (most frequently viewed, etc.), or some other manner. Additionally, the summary module content and layout can be organized as desired by a user. For example, a summary module can be presented in different shapes with component information located in different areas within the shape.

Figure 3A:
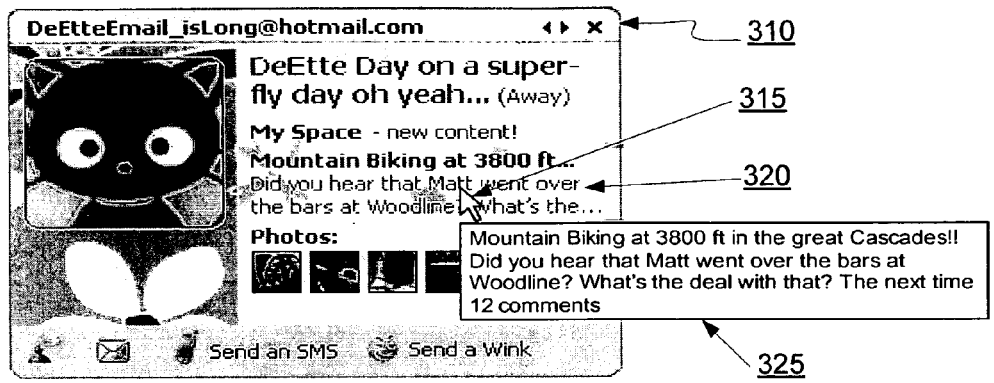
FIG. 3A illustrates one embodiment of a summary module having blog content selected.
Figure 3B:
FIG. 3B illustrates one embodiment of a summary module having photo content selected.
Figure 3C:
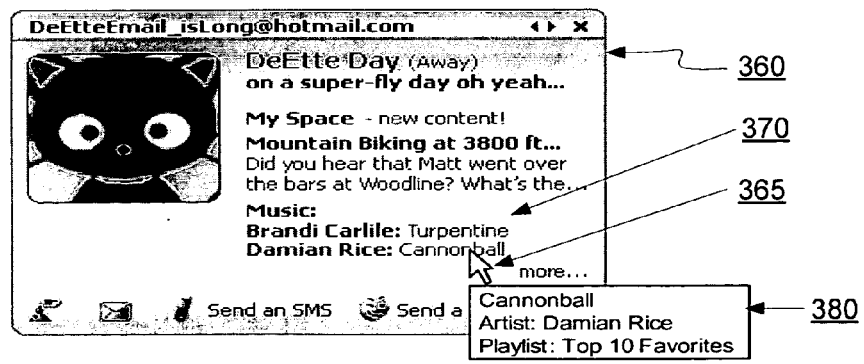
FIG. 3C illustrates one embodiment of a summary module having music content selected.

FIGS. 3A-3C illustrate embodiments of a summary module wherein the summary module is selected by a viewer. FIG. 3A includes summary module 310, blog content 320 within summary module 310, cursor 315 over blog content 320, and blog content window 325 overlapping summary module 310. Blog content 320 includes a portion of a blog title that reads, "Mountain Biking at 3800 ft . . . ", and a portion of a blog entry that begins with, "Did you hear that Matt went over the bars as Woodline". When cursor 315 is placed over the blog entry of blog content 320, the blog content window 325 is generated. The blog content window 325 includes the blog entry that begins with the blog title in the first line, the blog entry in the next three lines, and an indication reading "12 comments" in the last line. Both the blog title and blog entry of blog content 320 and blog content window 325 correspond to a blog component of the content page associated with the summary module. If the viewer were to provide an input, such as a mouse click, while the cursor is over the blog entry and currently displaying the blog content window, the client will request the content page content, including the blog component, from the content page server and display it on the local machine.

FIG. 3B includes summary module 330, photo content 335 within summary module 330, cursor 340 over photo content 335, and photo content window 350 overlapping summary module 330. Photo content 335 includes six thumbnail images. When cursor 340 is placed over a thumbnail of photo content 340, the photo content window 350 is generated. The first line of the photo content window 350 includes the title of the photo album the image belongs to, which reads "Hawaii Vacation". The second line of the photo content window 350 includes a description of the image selected, reading "Me & Pat". Both the photo album title and image description of the photo content window 350 correspond to a photo album component in the content page associated with the summary module. If the viewer provides an input, such as a mouse click, while the cursor 340 is over a thumbnail and currently displaying the photo content window 350, the client will request the content page content, including the photo component, from the content page server and display it on the local machine.

FIG. 3C includes summary module 360, list content 370 within summary module 360, cursor 365 over list content 370, and list content window 380 overlapping summary module 360. List content 370 includes a first song item reading "Brandi Carlile: Turpentine" and a second song item below the first song item reading "Damian Rice: Cannonball". When cursor 365 is placed over a song item of list content 370, the list content window 380 is generated. The first line of the list content window 380 includes the song title, reading "Cannonball", the second line includes the artist, reading "Artist: Damian Rice", and the third line includes the list title, reading "Playlist: Top 10 Favorites". The song item title, artist and play list of the list content window 380 correspond to a song list component in the content page associated with the summary module. If the viewer provides an input, such as a mouse click, while the cursor 365 is over a list item and currently displaying the list content window 380, the client will request the content page content, including the song list component, from the content page server and display it on the local machine.

Figure 4:
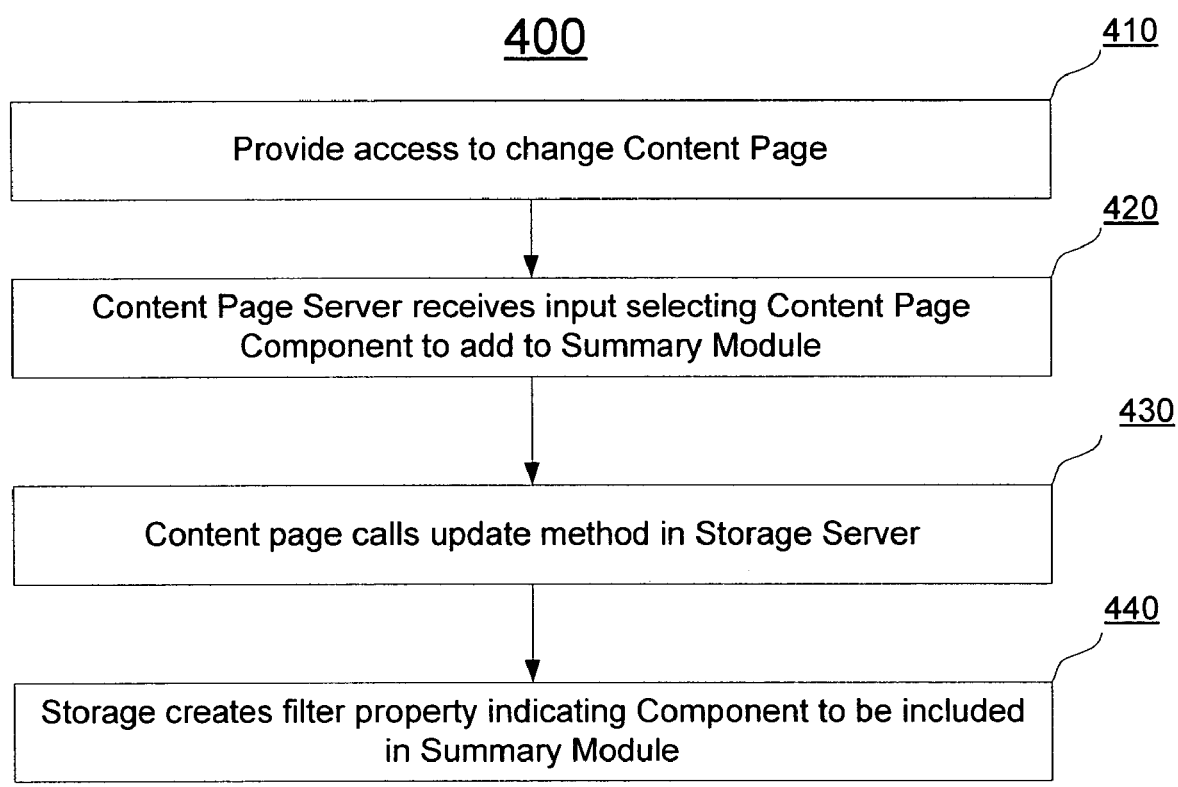
FIG. 4 illustrates one embodiment of a method for configuring a summary module.

When associated with a content page, a summary module can be configured by an owner of the content page. One method for configuring a summary module is illustrated in method 400 of FIG. 4. Access to the content page with authorization to change the page content is provided to the owner at step 410. In one embodiment, the authorization is provided after the owner provides identification and password information. While accessing the content page, the user may select a component of the content page and indicate that the component should be included in the owner's summary module. At step 420, the system receives input indicating a user has selected a content page component to add in the summary module. After the content page receives input selecting a component, the content page calls an update method in a storage server 820 (see FIG. 8) at step 430. The call includes a component identifier for the selected component and a content page identifier for the content page. Storage server 820 then creates a filter for the component at step 440 indicating how the component is to be included in summary module data requests. In one embodiment, the filter parameter includes a binary bit, wherein a value of one indicates the component is included in the summary module. The filter parameter may also include component item parameters that indicate how the component content should be included in the summary module. For example, a blog component filter may indicate that the blog entry title and the first 20 characters of the blog entry be included, a photo album filter may indicate that a photo album title and up to five thumbnails be included, and a play list component filter may indicate that the play list title and up to song titles and artists can be displayed. The filter parameters can be used by messenger client when sending summary module content requests and by storage server 820 to determine the components that take place in the notification process. The messenger client content query request and notification process are discussed in more detail below.

In one embodiment, permissions may be used to determine access to content pages and summary modules. An owner of a content page may specify one of more contacts on a permission list to receive updates of her content page. Those not on the permission list will not have access to view the content page, summary module and notifications associated with them. The contacts having permission can be entities that the user has a trusted relationship. In one embodiment, the contacts can be entities that the user already has a relationship with over a network. For example, the contacts may be a reference to or selected from the list of contacts maintained in an instant messaging service.

In one embodiment, a user can receive notifications for changes to content pages of the user's contacts through a stand-alone application client. A stand-alone client is a software program that resides in the local machine memory. One example of a stand-alone client is an instant messaging (IM) client. An IM client will be referred to in the following discussion for purposes of illustration.

Figure 5:
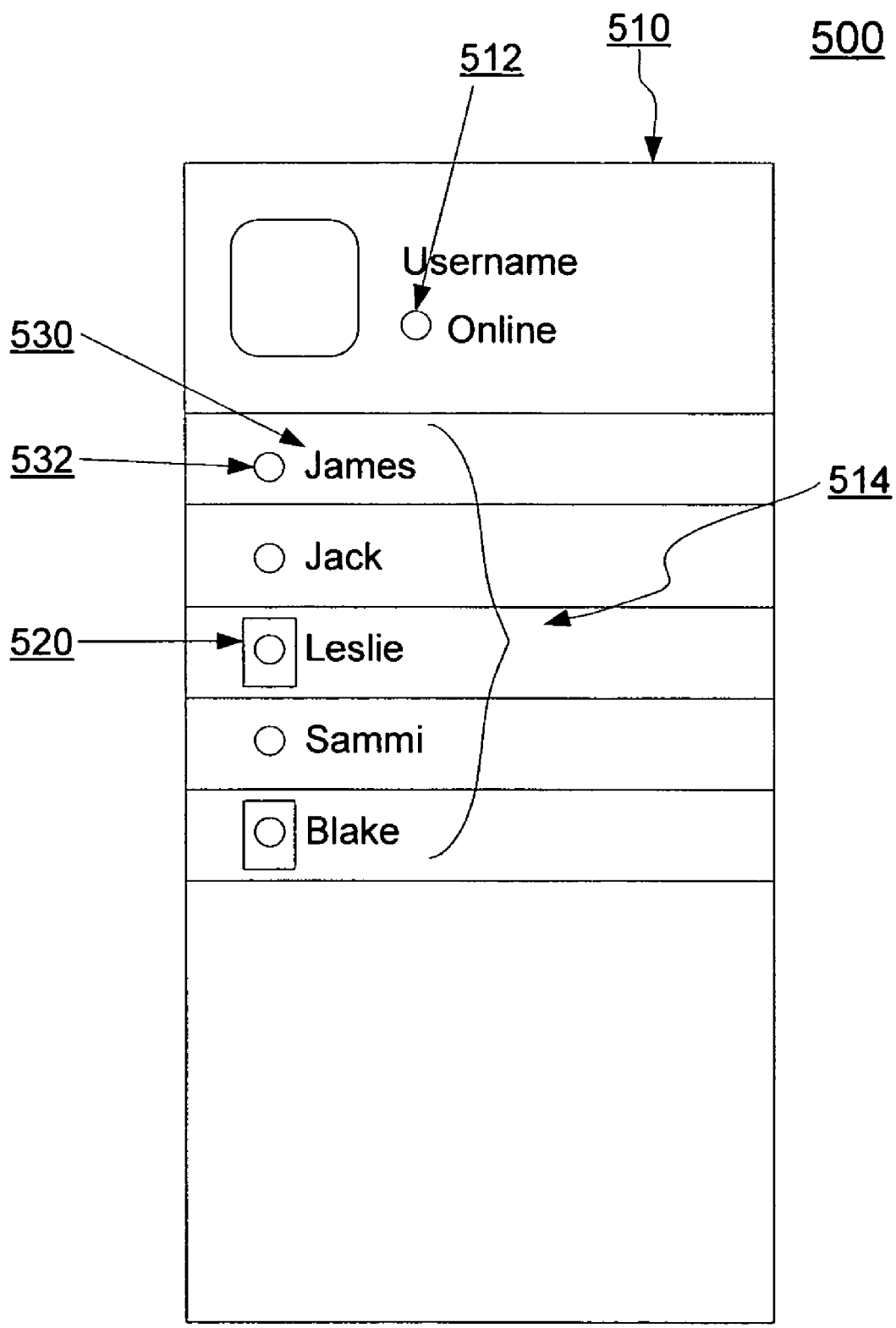
FIG. 5 illustrates one embodiment of a instant messaging user interface.

One embodiment of an IM user interface 500 is illustrated in FIG. 5. IM interface 500 includes window 510, user status indicator 512 within window 510, messenger contact list 514, visual indicator 520, and for each contact a contact indicator 530 and online indicator 532. Each time a user logs on to an IM service, a messenger server provides the members of messenger contact list 514 to the messenger client and indicates which members are associated with a content page. A user will typically have one or more contacts listed in messenger contact list 514. The user status indicator 512 indicates whether the user is currently logged into the messenger server. The online indicator 532 for each of the contacts on messenger contact list 514 indicates whether or not the contact is currently logged in to the messenger sever.

In one embodiment, visual indicator 530 serves to notify a user that a content page for a contact has changed. A visual indicator 530 can be implemented as a change in color surrounding the online indicator for a contact. When a contact from the messenger list 514 does not have a content page, no visual indication is shown as illustrated by online indicator 522 associated with the contact identifier "James". Some embodiments may provide visual indicators differently than that illustrated by FIG. 5, such as a highlighted contact identifier, a visual icon, shadow, special character, etc. displayed near the contact name or online indicator.

Figure 6:
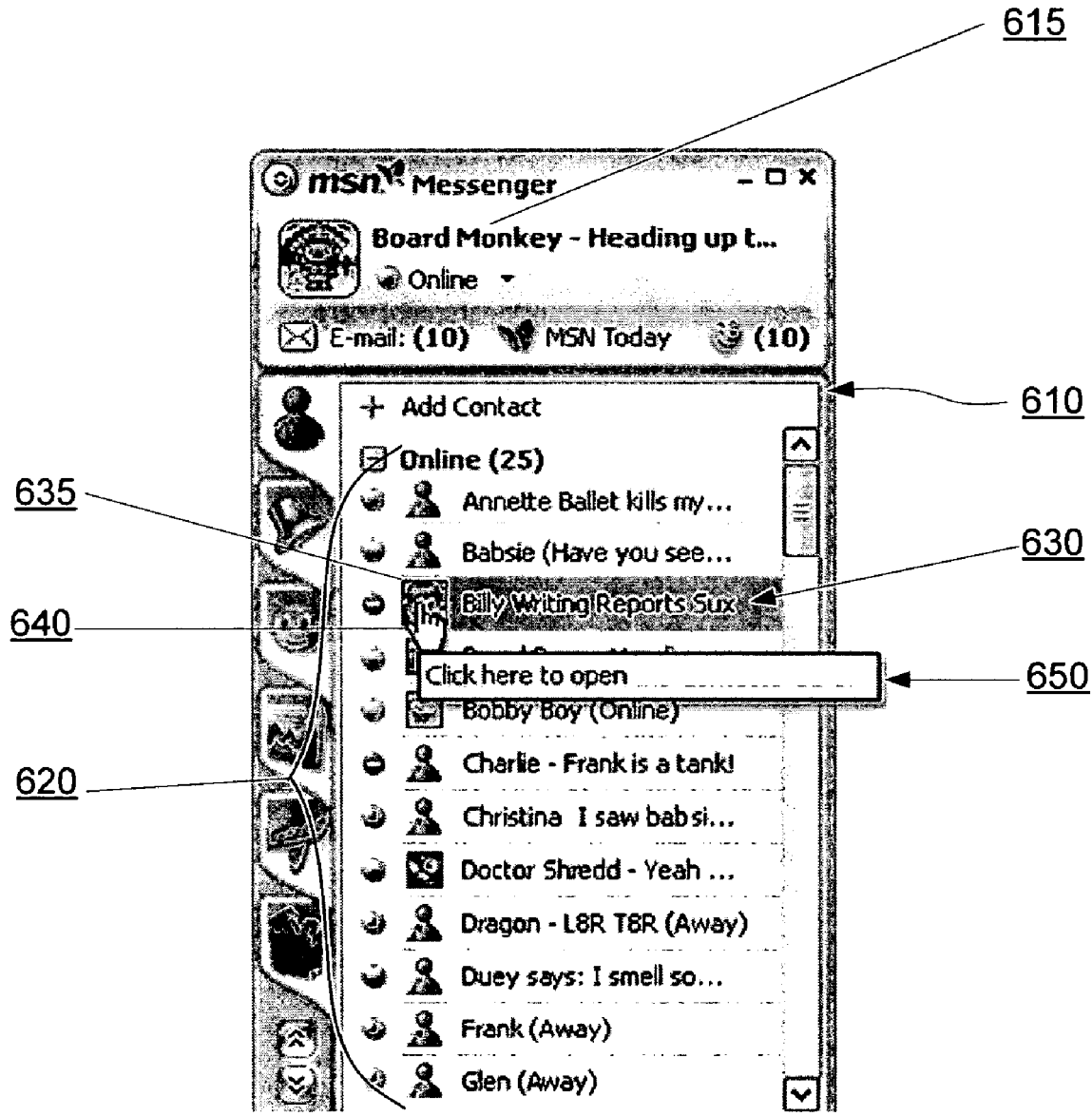
FIG. 6 illustrates one embodiment of a user interface for receiving input to provide a summary module.
Figure 7:
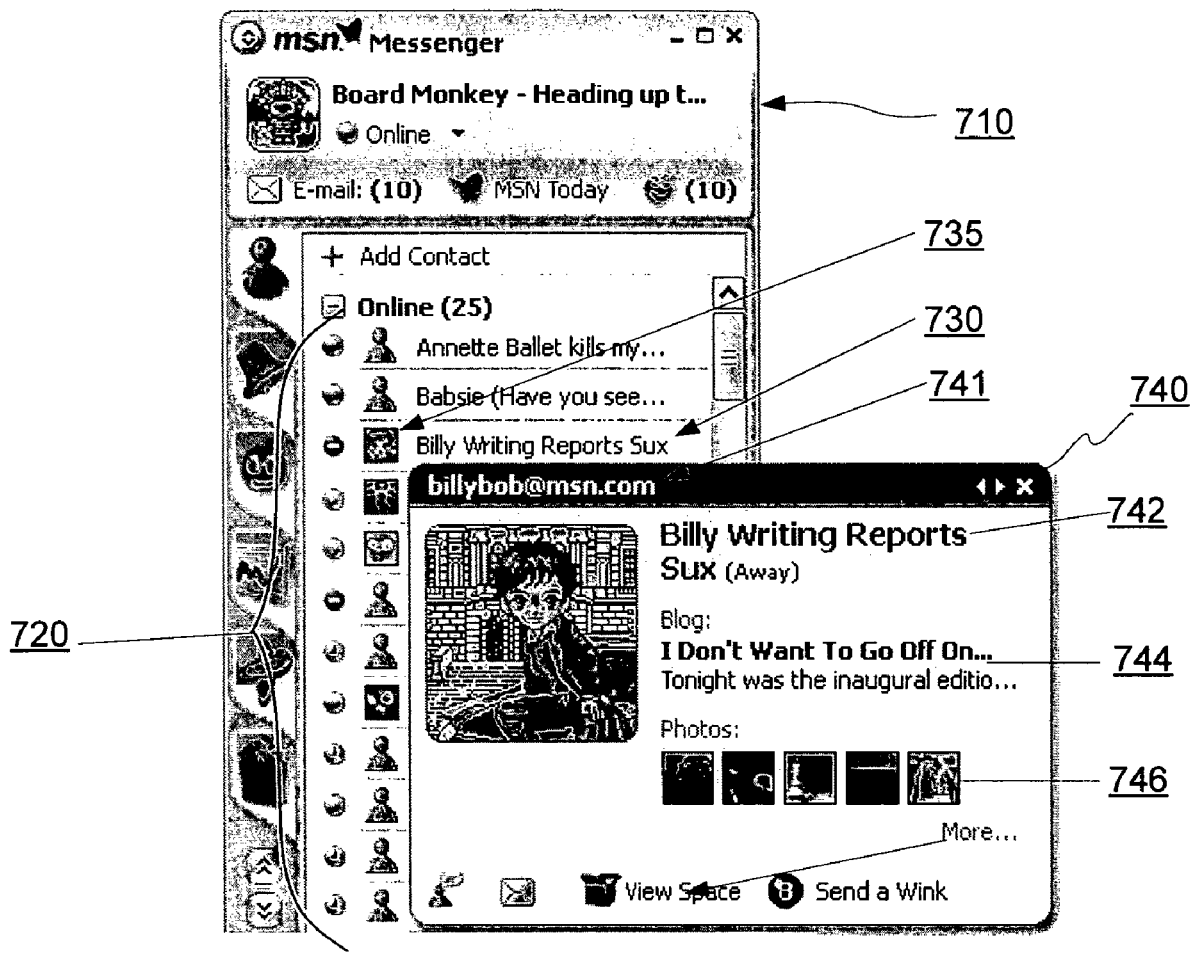
FIG. 7 illustrates one embodiment of a user interface providing a summary module.

From within a messenger client, a user may view a summary module by providing input to select a corresponding contact. Once selected, the messenger client retrieves and displays the summary module. FIGS. 6 and 7 illustrate a messenger client interface that can provide a summary module. FIG. 6 includes client interface window 610, a user nickname 615, messenger contact list 620, contact nickname 630, contact presence indicator 635, message window pointer 640 and message window 650. Client interface window 610 is an interface for allowing a user to receive alerts, engage contacts in message sessions and providing input to view content cards. The user associated with the user nickname 615 "Board Monkey" is signed into the messenger server through the messenger client interface. Messenger contact list 620 includes a number of contacts associated with the signed-in user. The contact presence indicator indicates whether a contact is currently signed in and has a content page. If a contact is currently signed in and the contact has a content page, the contact presence indicator can include an image from the content page. In the embodiment illustrated in FIG. 8, the image is an avatar. In one embodiment, a cursor can be placed over, or "hover" over, the contact presence indicator 635 associated with contact nickname 630, "Billy Writing Reports". As a result of hovering the cursor over the contact presence indicator, a message window 650 is displayed. A message window can include a summary module and/or can provide the user information regarding further steps the user can take to view content. Message window 650 provides text that reads "Click here to open". The message window pointer 640 points to the contact presence identifier 635 associated with the message window 650.

FIG. 7 illustrates a messenger user interface in which a summary module has been provided. In one embodiment, the summary module 740 is displayed as a result of the interface 710 of FIG. 7 receiving input selecting the contact presence indicator 735. FIG. 7 includes interface window 710, messenger contact list 720, contact nickname 730, contact presence indicator 735, summary module 740, contact identifier 741, summary module contact nickname 742, and summary module content 744 and 746. Summary module 740 corresponds to contact associated with contact nickname 730, "Billy Writing Reports". The contact nickname 742 in the summary module 740 is identical to the contact nickname 730 in the messenger user interface 710. In some embodiments, the summary module may be displayed by receiving as input, such as a right mouse button click, the selection of a contact presence indicator, a contact identifier, or some other visual indicator associated with a content page for a contact.

Figure 8:
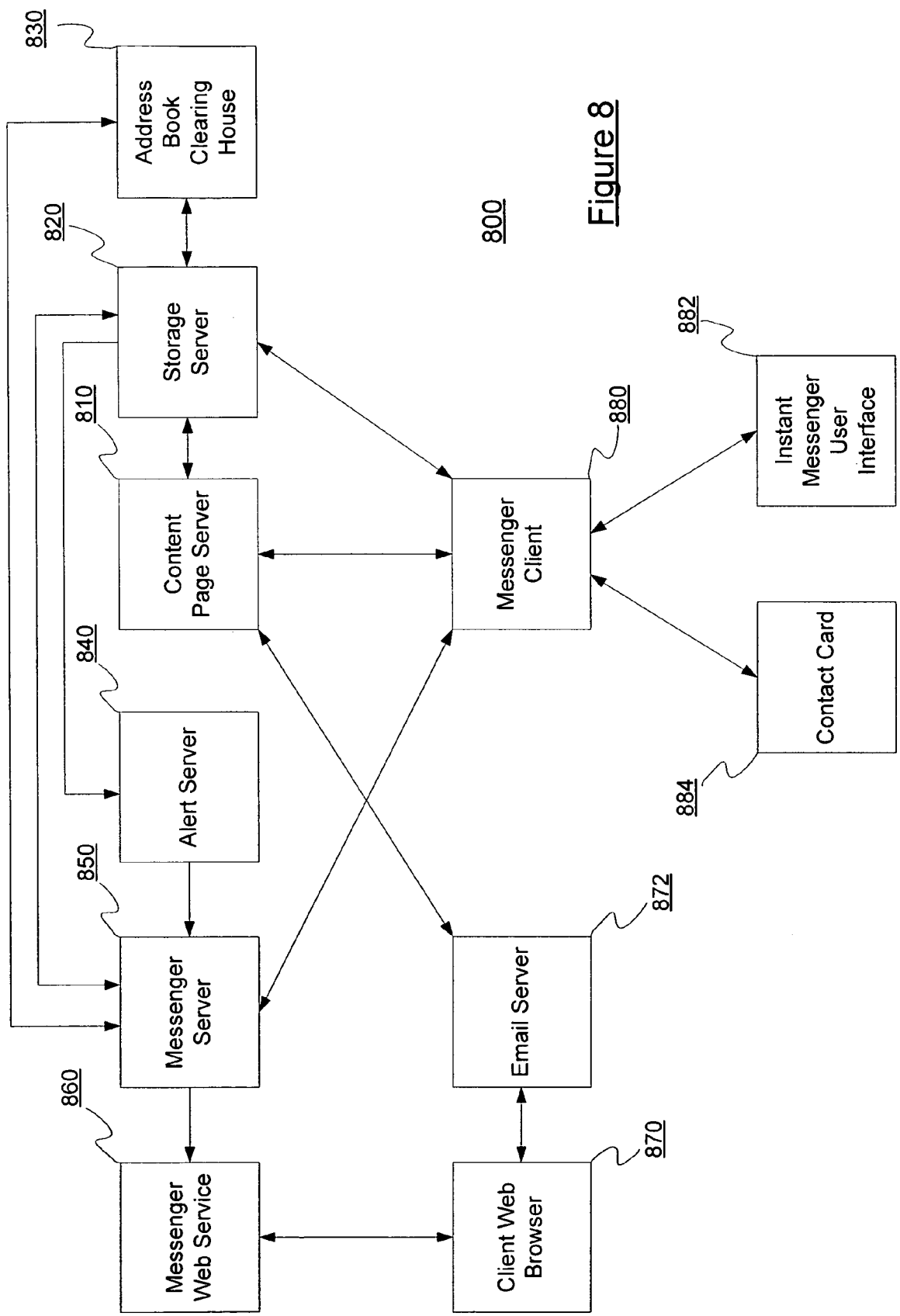
FIG. 8 illustrates one embodiment of a notification system.

A content page, summary module, automatic notification process and the dynamic synchronization between them may be implemented by a system such as that illustrated in FIG. 8. System 800 of FIG. 8 includes content page server 810 810, storage server 820, address book clearing house (ABCH) 830, alerts server 840, messenger server 850, messenger web service 860, client web browser 870, email server 872, messenger client 880, instant messenger user interface 882, and summary module 884.

Content page server 810 sends data to and receives data from storage server 820, messenger client 880, and email server 872, and may optionally send information to alert server 840 (not shown). ABCH 830 receives and transmits information with storage server 820 and messenger server 850. Messenger server 850 receives information from alert server 840 and receives and transmits information messenger client 880, storage server 820 and messenger web service 860. Messenger client 880 receives and transmits information with storage server 820, content page server 810, messenger client 880 884 and contact card interface 882. Client web browser 870 receives and transmits information with messenger web server 860 and email server 872. The communication between the devices of FIG. 8 are further explained below. Each of the servers and the client device of FIG. 8 can be implemented as computers known in the art. For example, they may include one or more processors in communication with one or more storage devices (memory, disk drives, etc) and one or more peripherals (monitor, keyboard, mouse, printer). The one or more storage devices store data and code for implementing the processes described herein.

Content page server 810 can be implemented as one or more web servers that configure content page information for requesting entities. The requesting entities may include messenger client 880 for IM applications, client web browser 870 for web pages and browser based email, and email server 872 for email applications. For example, content page server 810 provides content page content to messenger client 880, and email server 872 in an appropriate language such as English or French, depending on the locale of the user. Content information regarding a content page can be transmitted by an XML feed to messenger client 880 or packaged as HTML for email server 872 and client web browser 870. Content page server 810 also formats data received from storage server 820 before populating a requested summary module. Formatting can include removing header information from a blog, generating a proper sized thumbnail image for display into a summary module, and other formatting tasks.

Storage server 820 includes one or more databases where content page information is persisted. Storage server 820 can also contain summary module data, version and last-date-modified information for content pages, and content page components and component items, and permission information. In some embodiments, the permission information is maintained in a cache dynamically built by the storage server and returned to messenger clients. Messenger clients can then persist the cache. The cached permission information can include a cached permission list which is an opaque data structure used by storage server 820 to cache the user access credentials for a particular content page.

ABCH 830 stores user information. User information may include contact information such as telephone, email and address, a user contact lists (e.g., address book, messenger contact lists or buddy lists, and other lists), services utilized, group memberships, content page information and permission and roles information. Content page information may include whether or not the user has a content page, and other information. Permission and roles information can include permission list identifiers. Permission list identifiers enable storage server 820 to retrieve a user authorization cache, or cached permission list, from storage server 820 databases. Permission and roles information can also include the permissions the user has on the content pages owned by the contacts on his messenger contact list. For example, a user may have three contacts that have content pages. A first contact A may authorize the user to view A's entire content page, the second contact B may authorize the user to view selected modules of B's content page, and the third contact may not authorize the user view any of C's content page. The authorizations provided by A, B and C can be included in the permission list associated with A in ABCH 830.

A permission list identifier may be retrieved from ABCH 830 and cached on clients such as the client messenger. In one embodiment, the cached versions of the permission list identifier are only valid for a limited period of time, after which new permission list identifiers must be obtained. In one embodiment, a permission list identifier is valid for 24 hours.

Alert server 840 is used to deliver notifications to messenger server 850. The notifications can include information regarding stock quotes, email delivery, auction events, breaking news, new contacts, content page changes and other information from content providers. The alerts may be retrieved with IM client, and IM web services.

Messenger server 850 brokers connections between messenger client 880s and handles initial session connections, presence information and delivery of notifications. Messenger server 850 is discussed in more detail below. Messenger web service 860 facilitates an IM service provided over the Internet through a client web browser 870. Email server 872 provides an email service that can be accessed over the Internet through a client web browser 870. Messenger client 880 is a local program that provides an IM user interface and correlates received data to corresponding contacts.

Figure 9:
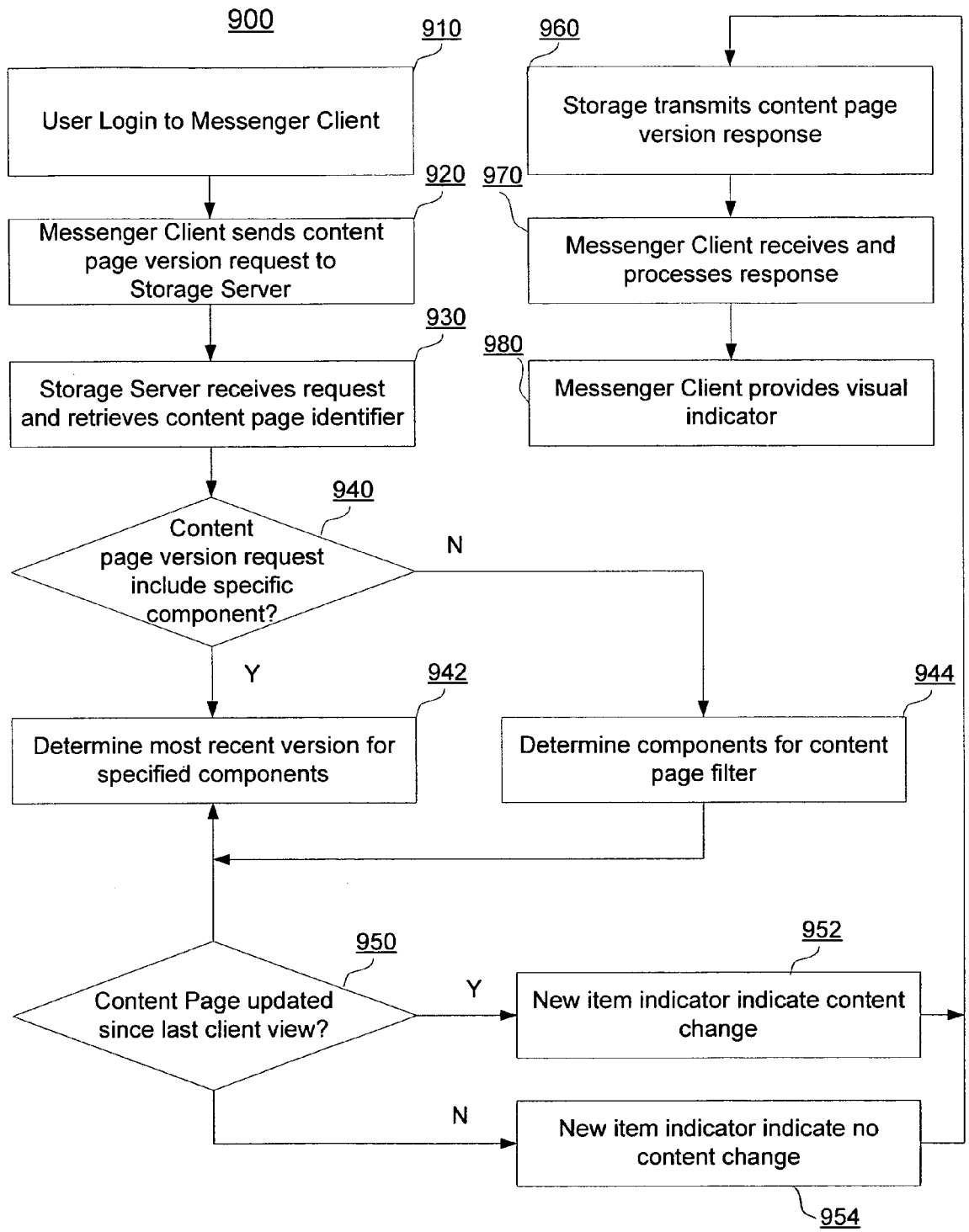
FIG. 9 illustrates one embodiment of a method for providing a visual indicator at log-in to a service.

As a content page is updated or changed by its owner, a notification of the change can be provided to contacts on the owners contact list. In one embodiment, changes are provided to contacts in the owner's messenger contact list. FIG. 9 illustrates a method 900 for adding a visual indicator to a messenger contact list at the time of user log on. Method 900 begins with step 910 where a user logs on to messenger client 880.

The log on process can include messenger client 880 prompting the user for log on information, such as a user name and password, and forwarding the logon information to messenger server 850. In one embodiment, upon receiving the logon information, messenger server 850 sends an identification confirmation query to ABCH 630 that includes the logon information received from the user. In some embodiments, messenger client 880 will send an identification confirmation query directly to ABCH 630. In this case, any response from the ABCH 630 can be sent directly to messenger client 880. ABCH 630 receives the logon confirmation query the and confirms the logon.

In some embodiments, ABCH 630 will confirm that the user name exists and that that password provided by the user matches a password stored in ABCH 630. In another embodiment, the messenger client or the messenger server may send the login information to a credential server (not illustrated in FIG. 8) and receive credential information in return. The credential information can then be provided to ABCH 630. ABCH 630 then confirms the credential information and operation continues.

Upon confirming the logon information, ABCH 630 will send an identification confirmation reply to messenger server 850. In some embodiments, the reply will include the username, a messaging contact list associated with the user, an indication whether each contact is associated with a content page, and an indication that the user associated with the username has a content page. In one embodiment, the indication can be in the form of a flag indicating the user has a content page, for example, a HasPage flag. Messenger server 850 receives the confirmation response from ABCH 630. Messenger server 850 then determines the presence information for the contacts on the user's messaging contact list. In some embodiments, messenger server 850 determines presence by determining whether each contact on the messaging contact list is currently signed in to messenger server 850. A contact that is signed in to messenger server 850 has a presence status of online. If the contact is not signed into messenger server 850, the contact has a presence status of offline. After determining the presence for each contact, messenger server 850 sends messenger client 880 a reply that includes the messenger contact list for the user, presence information for each contact, an indication whether each contact has a content page.

After logon, messenger client 880 transmits a content page version request to storage server 820 at step 920. In one embodiment, the content page version request may include filter information regarding what modules are relevant to the version request and, for each of the content pages associated with the messenger contact list, a content page identifier and the most recent version information known to messenger client 880. Filter information indicates the content page components that are included in the summary module associated with a content page. The content page identifier in a content page version request uniquely identifies the content page.

Figure 10:
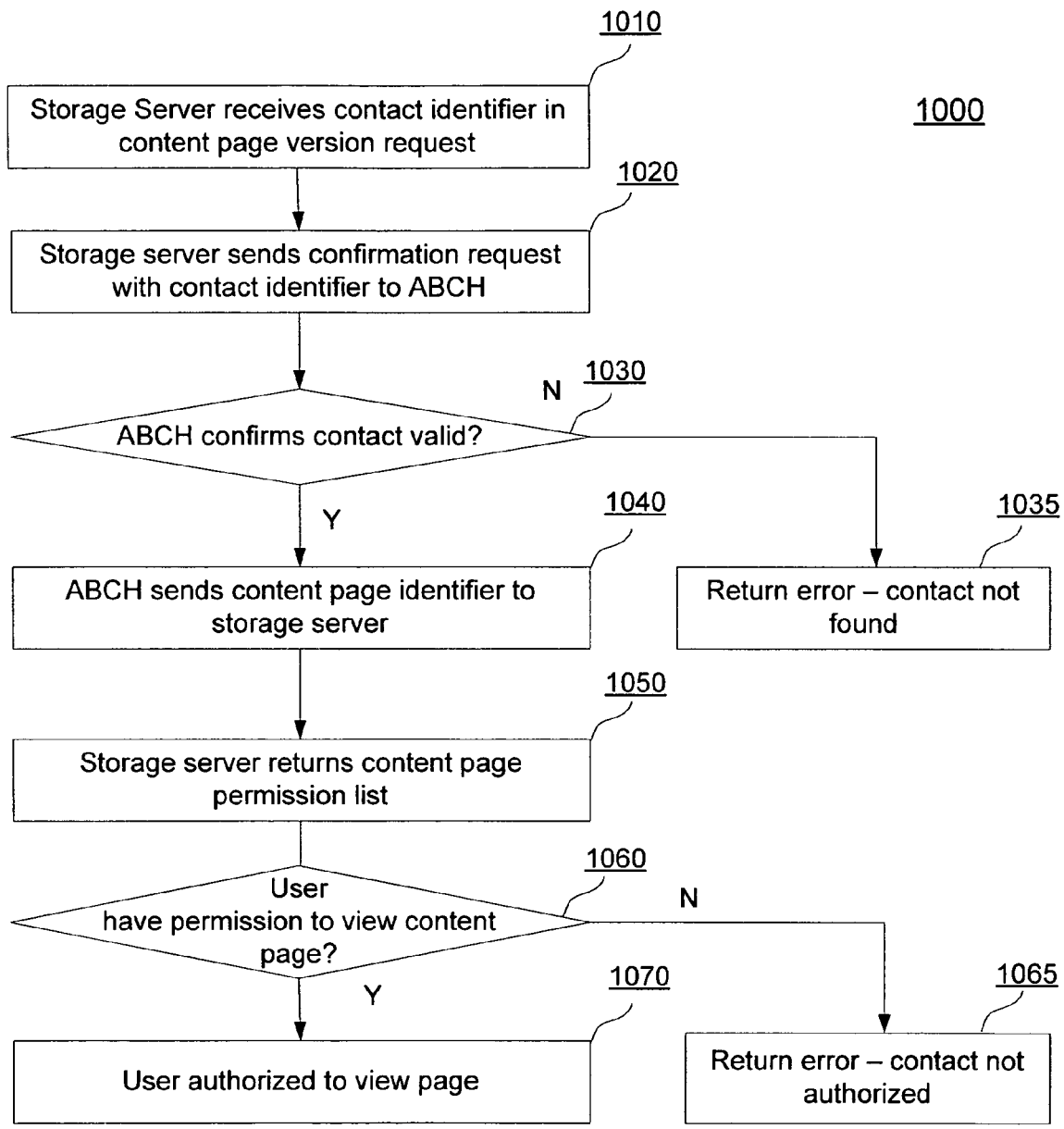
FIG. 10 illustrates one embodiment of a method for determining authorization to view a content page.

Upon receipt of the content page version request, storage server 820 retrieves the content page identifier associated with the summary modules requested at step 930. If messenger client 880 is requesting version information for the first time for a particular content page and doesn't know the content page identifier, storage server 820 needs to determine the content page identifier. A method for determining the content page identifier by storage server 820 is illustrated in FIG. 10. At step 1010, storage server 820 receives the contact identifier in the content page version request. After receiving the content page version request with the contact identifier, storage server 820 will send a confirmation request to ABCH 630 to confirm the contact identifier is valid at step 1020. In some embodiments, storage server 820 determines an alternative contact identifier from the contact identifier received in step 1010. The alternative contact identifier is then sent to ABCH 630 at step 1020.

In one embodiment, the content page version request allows the messenger client to specify a filter that determines the subset of content page components that version information is to be returned for. The filter allows the caller to specify attribute/value pairs, specific content types or combinations of the these. The storage server can collect version information for the content page components that match that criteria specified. The version information returned by the storage server can be applied to future queries that specify the same filter value.

At step 1030, to confirm the contact identifier is valid, ABCH 630 will look for the contact identifier in a list of contacts. If the contact identifier is found in the list of contacts, the contact identifier is determined to be valid and operation continues to step 1040. If the contact identifier is not found, ABCH 630 returns an error message to storage server 820 at step 1035.

ABCH 830 sends the content page identifier to storage server 820 at step 1040. Storage server 820 will then determine if the requesting user has permission to view the content page. To make the determination, storage server 820 first retrieves a permission list associated with the content page at step 1050. The permission list is a list of users authorized to view the content page and includes a permission list identifier and a list of contact identifiers authorized to view the content page. Storage server 820 then determines if the user has permission to view the content page at step 1060. If the user identifier is on the permission list, the user is authorized to view the content page and operation continues to step 1070. Otherwise, storage server 820 returns an error to messenger client 880 indicating the user is not authorized to view the summary module at step 1065.

In one embodiment, steps 1030 through 1060 are performed by ABCH 630 rather than ABCH 630 and storage server 820. In this case, ABCH 630 receives a request from storage to determine if the viewer has permission to view the content page. ABCH 630 then accesses a permission list associated with the content page owner. If ABCH 630 determines the viewer is authorized by the permission list to view the content page at step 1060, operation continues to step 1070. If not, operation continues to step 1065.

In one embodiment, a content page owner may provide different permissions for different contacts. For example, a content page owner may allow some contacts to view all components of a content page, allow other contacts to view selected components of a content page (for example, only name and email information or a blog component), and not allow some contacts to view any contact page content. As a result, different contacts can receive a summary module having different content from the same content page (the content that the contact has permission to view).

Returning to method 900, storage server 820 determines if the content page version request specifies a set of content page components at step 940. A content page version request specifying content page components includes the most recent version of the content page and its components known to messenger client 880. The component information may not be specified in a content page version request when messenger client 880 has not previously requested information for the summary module. In one embodiment, the most recent version information provided by the client is a time stamp indicating the date that messenger client 880 received summary module content for the particular component. The actual most recent version information for a content page and each of its components is stored in storage server 820. The most recent version information for the content page is the date of the most recent change to any of the content page components.

The content page version request allow the messenger client to specify a filter that determines the subset of content page components that version information is to be returned for. The filter allows the caller to specify attribute/value pairs, specific content types or combinations of the these. The storage server will collect version information for only content page components that match that criteria specified. The version information returned by the storage server will only be valid for future queries that specify the same filter value.

If the request specifies the components, operation continues to step 942 wherein storage server 820 accesses the version information for the specified components. When the components are not specified in a content page version request, operation continues to step 944 wherein storage server 820 determines the most recent version and/or what components should be included by accessing the filter information for each component in each content page. In one embodiment, the filter information is implemented as an annotation associated with each content page component. For example, a ComponentFilter annotation can have a value of one if the component is to be included in a summary module and a value of zero if it should not be included in a summary module. If the filter information for a component is included in the request, storage server 820 accesses and stores the component time stamp for those components at step 942.

In one embodiment, storage server 820 determines whether components in a content page have been updated since the last time a summary module was viewed by the user at step 950. To make this determination, storage server 820 compares the most recent version information for each component in the content page version request to the actual most recent version information associated with the content page. In one embodiment, the storage access the child items of each component, such as blog entries in a blog and images in a photo album, and compares the timestamp of the child item to that received in from messenger client 880. If one or more of the storage components have been updated since most recent version information received from messenger server 850, a new item indicator may be set to reflect that the content page has new content at step 952. In one embodiment, the new item indicator may be implemented as a flag, for example a HasNewItem flag. If the content page has not changed since the last view by the user, the new item indicator indicates is set to false at step 954.

Storage server 820 sends a content page version response to messenger client 880 at step 960. The content page version response can include the content page identifier, last modified information for the content page, the new item indicator, the permission list identifier and, for each component, a component summary. The component summary may include, for each component, a component identifier and the time stamp for the component. In some embodiments, the content page version request can return information for up to three hundred content pages, allowing the messenger client to request content pages for up to three hundred messenger contacts.

Messenger client 880 receives and processes the response at step 970. Messenger client 880 processing can include storing the response information locally, compares the component version information from the response to any component version information it contained in local memory. For each contact for which a more recent component version was received, a visual indicator is provided in the messenger user interface at step 980. Each visual indicator is associated with a contact indicator in the user interface. In some embodiments, storage server 820 will return a set of component identifiers indicating which components are included in the summary module. In this case, messenger client 880 will also determine whether new set of component identifiers was received in the content page version response, indicating that permissions have changed for the user. If the set of component identifiers has changed, messenger client 880 will store the new set and request the new set next time it requests information for that content page.

In one embodiment, when a content page owner logs into the instant messaging (IM) system (such as that provided by messenger server 850), the IM system will inform IM system users who have the content page owner on their messenger contact list that the content page owner is online and is associated with a content page. For example, when the content page owner logs into messenger server 850 through a messenger client 880, messenger server 850 will communicate to other messenger client applications that the content page owner is now online and associated with a content page. The messenger client applications can then update their user interfaces accordingly. This provides for an additional means of receiving an indication that a contact is associated with a content page.

Figure 11:
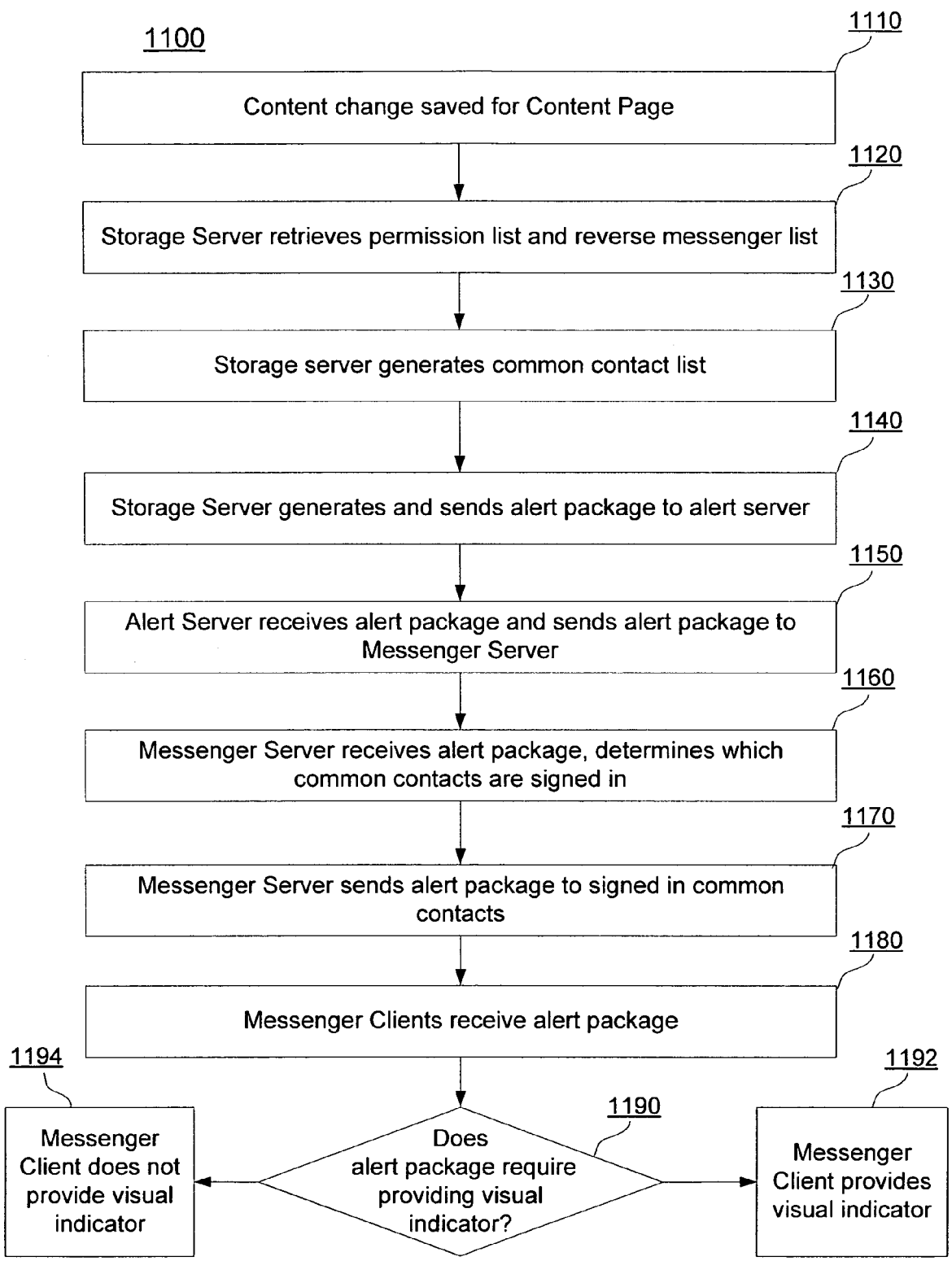
FIG. 11 illustrates one embodiment of a method for providing a visual indicator while logged in to a service.

In one embodiment, system 400 can, during a user session, provide a notification that a content page associated with a contact in a user's messenger contact list has changed. Method 1100 of FIG. 11 illustrates a method for adding a visual indicator to a contact indicator in a user interface while the user is logged into messenger server 850. At step 1110, a content page change is saved. In some embodiments, step 1110 will consist of detecting that a change was made to a content page with or without a save of the changes.

In another embodiment, an owner of a content page can configure content page notifications. For example, a content page owner can indicate when notifications are sent (periodically or based on occurrence of an event), which modules and actions may trigger a notification, to which contacts or groups notifications should be sent, and which devices and channels should receive notifications (messenger clients, mobile phones, email, etc.).

In one embodiment, a content change detection includes the content page owner saving a change and indicating that the change should be published or otherwise broadcast to contacts having the content page owner in their messenger contact list. In either embodiment, the content change can be detected by communicating the change to storage server 820. In another embodiment, the change is communicated to ABCH 630 or some other server. In one embodiment, a change may include one or more of adding a new item, changing an existing item, or deleting an item in a component. For example, a blog entry may be added, a photo or entire album may be changed, or a song may be deleted from a play list by a user.

Upon being changed, storage server 820 determines which contacts the changes should be sent to. In one embodiment, storage server 820 derives the list from the intersection of contacts having permission to view the content page and contacts belonging to the content page owner's messenger reverse list. The contacts having permission to view the content page are retrieved from a permission list stored on storage server 820 using a permission list identifier. The contacts on the page owner messenger reverse list are those who have the page owner on their own messenger contact list. Thus, the reverse list members are those who have the page owner as one of their contacts displayed in messenger client 880 user interface.

Storage server 820 retrieves the permission list and the reverse messenger list at step 1120. In one embodiment, the permission list identifier and the reverse messenger list are retrieved by storage server 820 from ABCH 630. Storage server 820 than takes retrieves the permission list using the permission identifier list. Once both lists have been retrieved, storage server 820 generates a common contact list that includes the contacts found in both the permission and reverse messenger list at step 1130.

Storage server 820 generates an alert for the changes made to the content page at step 1140. In one embodiment, an alert is generated for changes involving a newly added component or a new entry for an existing component. The parameters of an alert may include the content page identifier, component identifiers, the most recent version or last modified date for the component and the content page, an action performed (for example, insert, change or delete), a new item indicator indicating if the change should cause a visual indicator to be displayed in a client interface, and a component summary for the changed component. An alert component summary can be similar to a content page version response component summary, except that an alert component summary relates to a specific component. The alert component summary includes a component identifier and an array of item identifiers. The component identifier is the same as that in the content page version response. The item identifier array is an array of identifiers for the children or items within a component that have changed. For example, the item array may include an identifier for a deleted photo in a photo album, a changed blog entry, a new song in a play list, or some other item.

Alerts can be sent in XML format. In some embodiments, the alerts may be encoded by storage server 820. An example of an alert in XML that is not encoded, or has been decoded, is shown below:

```
<NotificationData xmlns:xsd="http://www.w3.org/2001/XMLSchema"
xmlns:xsi="http://www.w3.org/2001/XMLSchema-instance">
<SpaceHandle>
    <ResourceID>1pPoLF3i0OVO4J1K_FBbfiKA!101<\ResourceID>
<SpaceHandle>
    <LastModifiedDate>2004-08023T11:33:47.0693750-07:00
<\LastModifiedDate>
    <Action>Add<\Action>
    <HasNewItem>true<\HasNewItem>
```

-continued

```
<ComponentSummary>
    <Component xsi:type="MessageContainer">
    <ResourceID>1pPoLF3i0OVO4J1K_FBbfiKA!102<\ResourceID>
    <\Component>
    <Items>
        <Item xsi:type="Message">
        <ResourceID>1pPoLF3i0OVO4J1K_FBbfiKA!103
        <\ResourceID>
        <\Item>
    <\Items>
    <\ComponentSummary>
<\NotificationData>
```

Alert server 840 sends the alert package with the common contact list derived in step 1030 to messenger server 850 460 at step 1150. Messenger server 850 receives the alert and determines which of the common contacts are signed into messenger server 850 at step 1160. Messenger server 850 then sends the alert package to those messenger client 880 applications associated with those contacts at step 1170. In some embodiments, the alert may be routed to a messenger client 880, browser, mobile device, email server 872 or other entity depending on the system. When a contact that is to receive an alert is not signed in, the alert package is ignored. The contact will receive the updates at the next log-on when messenger client 880 compares the summary module cache information to the content page latest version information.

Messenger client 880 receives the alert package at step 1180. At step 1190, messenger client 880 processes the alert and determine if a visual indication should be provided in the user interface. First, messenger client 880 determines if the alert is associated with a contact that is included in the user's messenger contact list (e.g., has not been deleted from the messenger contact list). Messenger client 880 then determines whether the last modified date information is more recent than the last modified date for the component stored in local memory. In one embodiment, the client will only make this determination if the new item indicator in the list indicates that a visual indicator should be provided (thereby indicating that there is new content in at least one component). If the alert is associated with a contact in the messenger contact list and the last modified date for at least one component is more recent than that for the cached component, messenger client 880 will provide an indicator corresponding to the contact at step 1092. Otherwise, operation continues to step 1194 where messenger client 880 does not provide a visual indicator for the particular contact. The client also stores the alert package information, including the last date modified information for both the component and the component items and the changes to the summary module indicated by new components.

Figure 12:
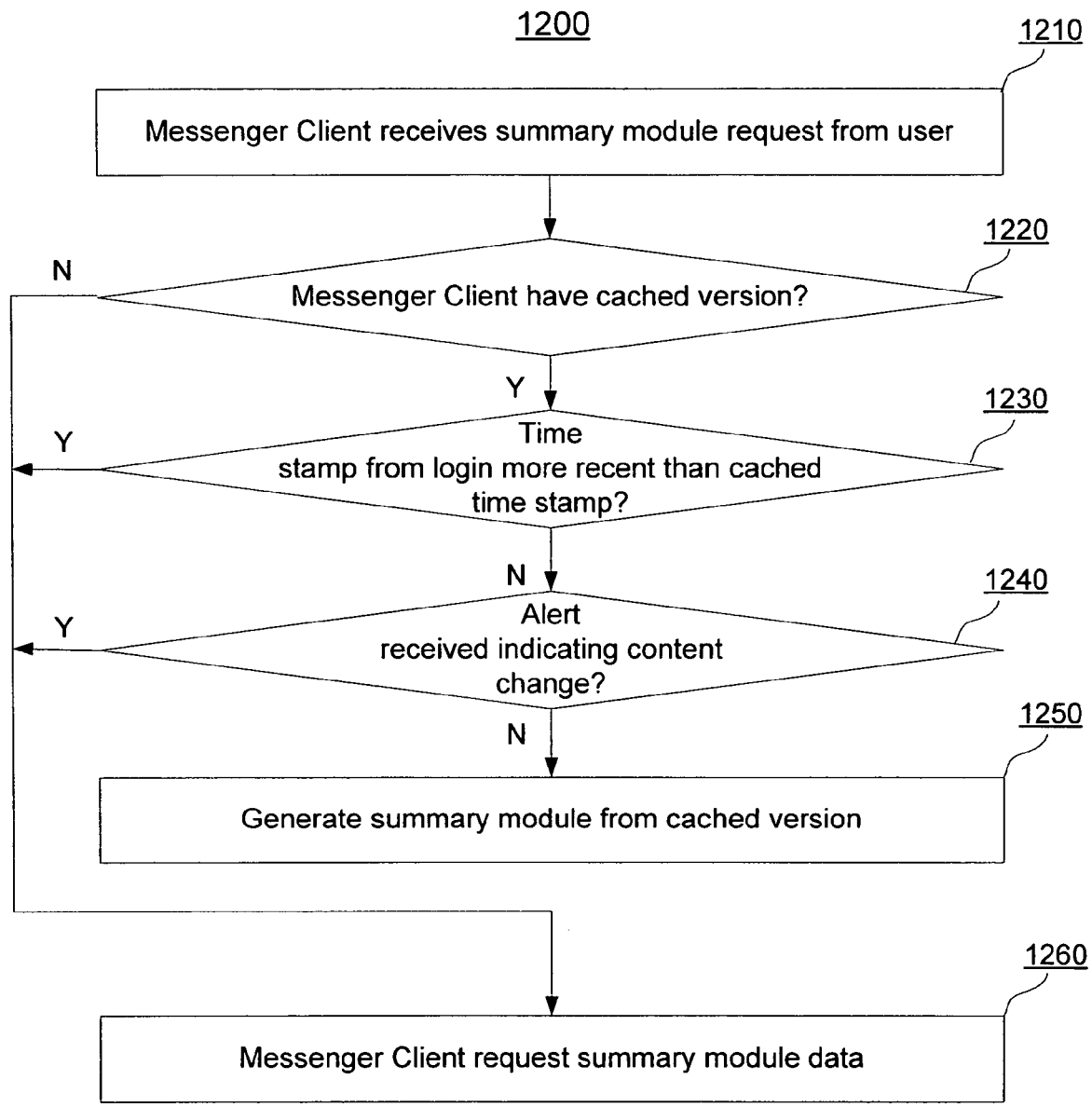

When a messenger client 880 receives input indicating a summary module should be displayed, messenger client 880 should determine from where to load the summary module. The input may include selection, such as a right mouse button click, on a contact presence indicator, a contact identifier, or some other visual indicator associated with a content page for a contact. Method 1200 of FIG. 12 illustrates a method for determining a source for a summary module. Messenger client 880 receives a summary module request at step 1210. Messenger client 880 then determines whether a cached version of the summary module is available at step 1220. A cached version may be available if messenger client 880 has received the summary module previously. If no cached version is available, operation continues to step 1260.

If a cached version is available, operation continues to step 1230 wherein the system determines if the time stamp received in the content page version response at login is more recent the time stamp associated with the cached version of the summary module. If the time stamp from the content page version response is more recent than the timestamp of the cached summary module, operation continues to step 1260. If not, the system determines if an alert was received that indicates the content page has changed at step 1240. In one embodiment, if an alert was received indicating the content page has changed, a new item indicator stored by messenger client 880 will indicate this. Thus, messenger client 880 may retrieve the value of the indicator to determine if an content page change alert was received. If an alert has been received at step 1240, operation continues to step 1260. If no alert has been received at step 1240, operation continues to step 750. At step 1260, the system has determined that the cached version of the summary module may be outdated and the most recent version of summary module data should be requested. At step 750, messenger client 880 determines that no change has occurred to the content page since the last time summary module data was loaded. Accordingly, the summary module should be loaded from the cached version.

In some embodiments, messenger client 880 may maintain an indicator that indicates whether the content page associated with a contact has a new item, for example a HasNewItem flag. Thus, for each contact, if the time stamp received in the content page version response is more recent than the cached timestamp, a changed content page alert is received, or there is no cached version, the new content flag will contain a value indicating the content page and corresponding summary module data has changed. Rather than going through method 1200, the system will check the value of the new content flag to determine where the summary module should be loaded from.

Figure 13:
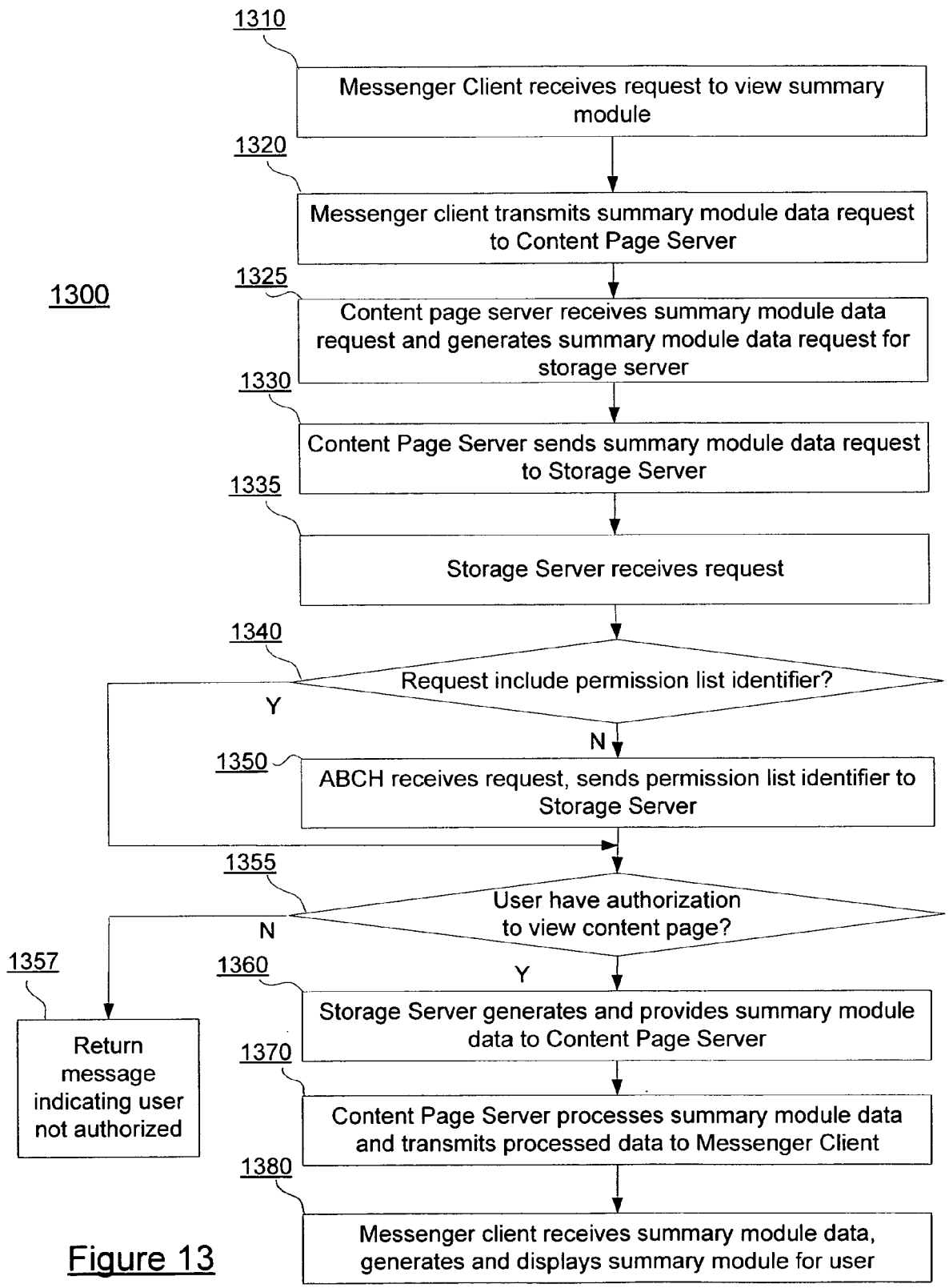
FIG. 13 illustrates one embodiment of a method for retrieving summary module data.

FIG. 13 illustrates a method 1300 for retrieving a summary module. Messenger client 880 receives a request to view a summary module for a user at step 1310. In some embodiments, messenger client may poll the content page server 810 or storage server 820. In this case, a request for summary module data can be triggered when the poll returns an indication that the summary module has been changed. Once the request is received, messenger client 880 transmits a summary module content request to content page server 810 for the summary module at step 1320.

In one embodiment, messenger client 880 transmits a summary module data request directly to storage server 820. In this case, storage server 820 can transmit a summary module data response directly to messenger client 880. The summary module data request and summary module data response are discussed in more detail below.

The summary module content request can have parameters including the content page identifier, the last modified date of the content page, a filter indicating which components to return content from, the component entry type, the number of entries for each type and the fields to return on the component children.

An example of a summary module content request is shown below.

```
Content-Type: text/xml; charset=utf-8
Content-Length: length
SOAPAction: "http://www.msn.com/webservices/spaces/v1/GetXmlFeed"
<?xml version="1.0" encoding="utf-8"?>
<soap:Envelope xmlns:xsi="http://www.w3.org/2001/XMLSchema-instance"
```

-continued

```
xmlns:xsd="http://www.w3.org/2001/XMLSchema"
xmlns:soap="http://schemas.xmlsoap.org/soap/envelope/">
  <soap:Body>
    <GetXmlFeed xmlns="http://www.msn.com/webservices/
      spaces/v1/">
      <refreshInformation>
        <brand>string</brand>
        <market>string</market>
        <maxCharacterCount>int</maxCharacterCount>
        <maxElementCount>int</maxElementCount>
        <maxImageCount>int</maxImageCount>
        <spaceResourceId>string</spaceResourceId>
        <storageAuthCache>string</storageAuthCache>
      </refreshInformation>
    </GetXmlFeed>
  </soap:Body>
</soap:Envelope>
```

Content page server 810 receives the request and generates a summary module data request for storage server 820 at step 1325. The request to storage server 820 includes a time stamp of the last view of the summary module by messenger client 880. The time stamp may have a value of zero or false if the summary module has not been requested previously by messenger client 880. The request may also indicate specific components of the summary module, and a number of child items. The number of child items may relate to the number of thumbnails requested, number of blog entries, number of songs, or some other data.

One example of the format for a summary module data request from a content page server 810 to a storage server 820 is shown below.

```
POST /StorageService/SpacesService.asmx HTTP/1.1
Host: storage.msn.com
Content-Type: text/xml; charset=utf-8
Content-Length: length
SOAPAction: "http://www.msn.com/webservices/storage/v1/
GetItemSummary"
<?xml version="1.0" encoding="utf-8"?>
<soap:Envelope xmlns:xsi="http://www.w3.org/2001/XMLSchema-
instance"
xmlns:xsd ="http://www.w3.org/2001/XMLSchema"
xmlns:soap="http://schemas.xmlsoap.org/soap/envelope/">
  <soap:Header>
    <SpacesApplicationHeader
xmlns="http://www.msn.com/webservices/storage/spaces/v1">
      <ApplicationID>string</ApplicationID>
    </SpacesApplicationHeader>
    <SpacesIdentificationHeader
xmlns="http://www.msn.com/webservices/storage/spaces/v1">
      <Puid>long</Puid>
      <IPAddress>string</IPAddress>
    </SpacesIdentificationHeader>
  </soap:Header>
  <soap:Body>
    <GetItemSummary
xmlns="http://www.msn.com/webservices/storage/spaces/v1">
      <spaceSummaryRequest>
        <SpaceHandle>
          <ResourceID>string</ResourceID>
          <RelationshipName>string</RelationshipName>
          <Alias>
            <Name>string</Name>
            <NameSpace>string</NameSpace>
          </Alias>
        </SpaceHandle>
        <ComponentVersion>
          <ResourceID>string</ResourceID>
          <LastModifiedDate>dateTime</LastModifiedDate>
          <MaxReturn>int</MaxReturn>
        </ComponentVersion>
      </spaceSummaryRequest>
```

-continued

```
<spaceRequestFilter>
    <SpaceFilterAttributes>Annotation</SpaceFilterAttributes>
    <FilterValue>int</FilterValue>
</spaceRequestFilter>
<itemTypeFilter>
    <ItemTypeFilter>
        <ItemType>Item or Space or MessageContainer or List or ListEntry or Message or File or Folder or Photo or Document</ItemType>
        <ItemCount>int</ItemCount>
        <AttributesToReturn>
            <ItemType>boolean</ItemType>
            <ResourceID>boolean</ResourceID>
            <Owner>boolean</Owner>
            <Creator>boolean</Creator>
            <Size>boolean</Size>
            <Version>boolean</Version>
            <DateCreated>boolean</DateCreated>
            <DateModified>boolean</DateModified>
            <Relationships>boolean</Relationships>
            <Name>boolean</Name>
            <Annotations>boolean</Annotations>
            <UserRoleDefinition>boolean</UserRoleDefinition>
            <RoleDefinitionName>boolean</RoleDefinitionName>
            <PolicyName>boolean</PolicyName>
            <AclRegions>boolean</AclRegions>
            <Flags>boolean</Flags>
        </AttributesToReturn>
    </ItemTypeFilter>
    <ItemTypeFilter>
        <ItemType>Item or Space or MessageContainer or List or ListEntry or Message or File or Folder or Photo or Document</ItemType>
        <ItemCount>int</ItemCount>
        <AttributesToReturn>
            <ItemType>boolean</ItemType>
            <ResourceID>boolean</ResourceID>
            <Owner>boolean</Owner>
            <Creator>boolean</Creator>
            <Size>boolean</Size>
            <Version>boolean</Version>
            <DateCreated>boolean</DateCreated>
            <DateModified>boolean</DateModified>
            <Relationships>boolean</Relationships>
            <Name>boolean</Name>
            <Annotations>boolean</Annotations>
            <UserRoleDefinition>boolean</UserRoleDefinition>
            <RoleDefinitionName>boolean</RoleDefinitionName>
            <PolicyName>boolean</PolicyName>
            <AclRegions>boolean</AclRegions>
            <Flags>boolean</Flags>
        </AttributesToReturn>
    </ItemTypeFilter>
</itemTypeFilter>
</GetItemSummary>
</soap:Body>
</soap:Envelope>
```

The summary module data request is sent to storage server 820 at step 1330.

In one embodiment, before providing the requested data to content page server 810, storage server 820 confirms whether or not the requesting user has permission to view the summary module at step 1340. Storage server 820 determines whether the summary module data request included the permission list identifier for the content page at step 1340. If the permission list identifier was included, operation continues to step 1355. Otherwise, storage server 820 requests the permission list identifier from ABCH 630 using the content page identifier. At step 1350, ABCH 630 receives the storage request, retrieves the permission list identifier and provides the identifier to storage server 820. Operation then continues to step 1355.

Storage server 820 retrieves the permission list using the permission list identifier and determines if the user has authorization to view the content page using the permission list in ABCH at step 1355. If the user does not have permission, the storage module replies with an error message to content page server 810 at step 1357. Content page server 810 then sends a message to messenger client 880 indicating that the user does not have permission to view the summary module or that the card is not available. If the user is on the permission list, the user has authorization to view the content page and operation continues to step 1360.

Storage server 820 processes content page server 810 request and sends a summary module data response to content page server 810 at step 1360. Processing the request can include accessing the components and child items that are specified by the filter information of the request and have a last modified date that is more recent then the last modified date provided by the client. Storage server 820 may return an error if either the content page identifier is invalid or the permission to view has been denied.

The summary module data response can have parameters including the content page identifier, the date the content page was last modified, a new item indicator indicating if any components have been changed since the last modified data provided by the client, and a component summary for each component. The component summary provides the identifier and time stamp as in the above discussion.

An example of the a summary module data response format is shown below.

```
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soap="http://schemas.xmlsoap.org/soap/envelope/">
    <soap:Body>
        <GetItemSummaryResponse
xmlns="http://www.msn.com/webservices/storage/v1">
            <GetItemSummaryResult>
                <SpaceHandle>
                    <ResourceID>string</ResourceID>
                    <RelationshipName>string</RelationshipName>
                    <Alias>
                        <Name>string</Name>
                        <NameSpace>string</NameSpace>
                    </Alias>
                </SpaceHandle>
                <LastModifiedDate>dateTime</LastModifiedDate>
                <ComponentSummaries>
                    <ComponentSummary>
                        <Component xsi:nil="true" />
                        <Items xsi:nil="true" />
                    </ComponentSummary>
                    <ComponentSummary>
                        <Component xsi:nil="true" />
                        <Items xsi:nil="true" />
                    </ComponentSummary>
                </ComponentSummaries>
            </GetItemSummaryResult>
        </GetItemSummaryResponse>
    </soap:Body>
</soap:Envelope>
```

Upon receiving the summary module data response, the content page summary processes the data and transmits the processed content to messenger client 880 at step 1370. The processing may include placing the content in the correct language, removing header and formatting information from blog entries, and other tasks. An example of a summary module content response sent from content page server 810 to messenger client 880 is shown below.

```
HTTP/1.1 200 OK
Content-Type: text/xml; charset=utf-8
Content-Length: length
<?xml version="1.0" encoding="utf-8"?>
<space xmlns:xsd="http://www.w3.org/2001/XMLSchema"
xmlns:xsi="http://www.w3.org/2001/XMLSchema-instance">
    <contactCard xmlns="http://www.msn.com/webservices/spaces/v1/">
      <storageAuthCache />
      <elements returnedMatches="2" totalMatches="3">
        <element type="SpaceTitle">
          <title>My Space</title>
          <url>http://spaces.msn-int.com/members/someone/</url>
        </element>
        <element type="Blog">
          <subElement lastUpdated="2004-08-30T16:05:10.7400000-07:00"
type="Post">
<description>スペースについての説明やスペ
ースについての説明やスペースについての説明やスペ
ースについての説明やスペースについての説明やスペ
ースについての説明やスペースについての説明やスペ
ースについての説明やスペースについての説明やスペ
ースについての説明やスペースについて</description>
          <title>TEST</title>
          <tooltip>Comments: 0</tooltip>
          <url>http://spaces.msn-int.com/members/someone/Blog/cns!1p5HyjrG8J-
ymsZzDHrEzetA!138.entry</url>
          </subElement>
          <title>Blog:</title>
          <url>http://spaces.msn-int.com/members/someone/</url>
        </element>
        <element type="Album">
          <subElement
xsi:type="spaceContactCardElementsElementPhotoSubElement"
lastUpdated="2004-08-30T12:35:00.0000000-07:00" type="Photo">
          <description>Photos</description>
          <title>asdfsd</title>
          <tooltip>TitleForAlbum
asdfsd</tooltip>
          <url>http://storage.msn-
int.com/x1pAdjo0uCo2H0_gLZJ8A4Isu_wbkJyJ11jBLPKcp4D5MdEoQ5qmH9cV
yfzpp7frNVdngikkXv26s-aTN88D7P0UFEEU7tZqV7aeI5WXReMyP4W-
6G337SSwA</url>
          <thumbnailUrl>http://storage.msn-
int.com/x1pAdjo0uCo2H0_gLZJ8A4Isu_wbkJyJ11jBLPKcp4D5MdEoQ5qmH9cV
2NsHRtA8J4POylqJ_GafPZ_0t6Vocqe0s3oI3fC1ttSyYMPdvC-
VAUwAnebBVGiLw</thumbnailUrl>
          </subElement>
          <subElement
xsi:type="spaceContactCardElementsElementPhotoSubElement"
lastUpdated="2004-08-30T12:34:00.0000000-07:00" type="Photo">
          <description>Photos</description>
          <title>asdfsd</title>
          <tooltip>TitleForAlbum
asdfsd</tooltip>
          <url>http://storage.msn-
int.com/x1pAdjo0uCo2H0_gLZJ8A4Isu_wbkJyJ11jBLPKcp4D5MfyWvlD_ks4bM
O39dTtlXLwaS3MTwOCSTmTM9cMikJfswVfiA0RoYm5HH-u-
6kG11NRNjqL79Gd-g</url>
          <thumbnailUrl>http://storage.msn-
int.com/x1pAdjo0uCo2H0_gLZJ8A4Isu_wbkJyJ11jBLPKcp4D5MfyWvlD_ks4bF4
COkYjZuM9rpyWGMMhX7ICNMnli1KAbGrsRLGGzxaXxq6warhQXDpOTd29T8x
rwA</thumbnailUrl>
          </subElement>
          <title>Photos:</title>
          <url>http://spaces.msn-int.com/members/someone/</url>
        </element>
      </elements>
      <lastUpdate>2004-08-30T16:05:10.8130000-07:00</lastUpdate>
    </contactCard>
</space>
```

Next, at step 1380, messenger client 880 receives the summary module content response. Messenger client 880 stores the information in the response and generates the summary module. In some embodiment, the information stored by the client may include one of more of the content page, component page and component child identifiers and timestamps, the HasNewSpace flag, and the permission list identifier.

Figure 14:
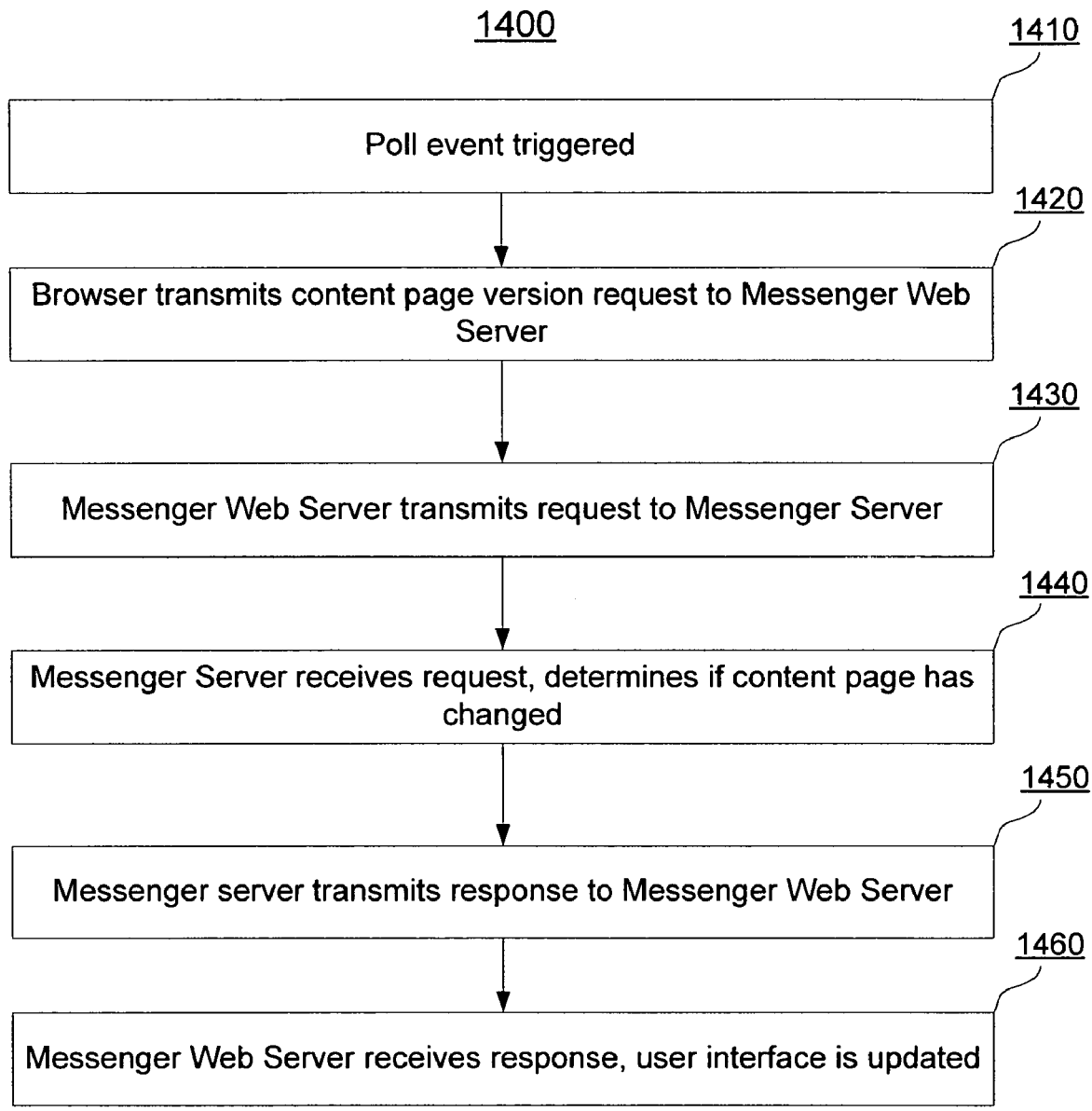
FIG. 14 illustrates one embodiment of a method for providing a visual indicator in a network browser.

In one embodiment, the summary module can be viewed through a messaging service implemented on a network browser, for example a web browser. An IM user interface implemented as a web service can have the same user interface and user experience as a messenger client 880. The communication between content page server 810, storage server 820, and ABCH 830 are the same as well. The only changes in protocol take place between messenger web service 860 and content page server 810. A method 1400 for adding a visual indicator to a IM user interface implemented as a network browser is illustrated in FIG. 14. A polling event is triggered at step 1410. The web messenger does not have a dedicated connection to messenger server 850 as messenger client 880s do. Thus, to determine if content pages have been updated, the web messenger can periodically poll messenger server 850 for alerts. The polling event may be triggered by an internally generated event, such as the expiration of the period of time, or by user input. Once a polling event is triggered, the browser transmits a content page version request to the messenger web server at step 1420. In one embodiment, the request of step 1420 is made in the form of an HTTP request. Upon receipt of the request, the messenger web server transmits a request to messenger server 850 for changed content page information for the contact pages associated with the user's messenger contact list at step 1430.

Messenger server 850 determines the changes at step 1440. In one embodiment, messenger server 850 accesses any alerts received that relate to the messenger contact list. In another embodiment, messenger client 880 retrieves the most recent timestamp information for the appropriate content pages from storage server 820. Messenger server 850 then transmits a reply to the messenger web server at step 1450. In one embodiment, the changes to be made to the web messenger for any required visual indicators are provided as java script events. The java script events indicate how the network browser is updated to include visual indicators for contacts having changed content pages. The message is then received by the web messenger and the user interface is updated at step 1460.

Figure 15:
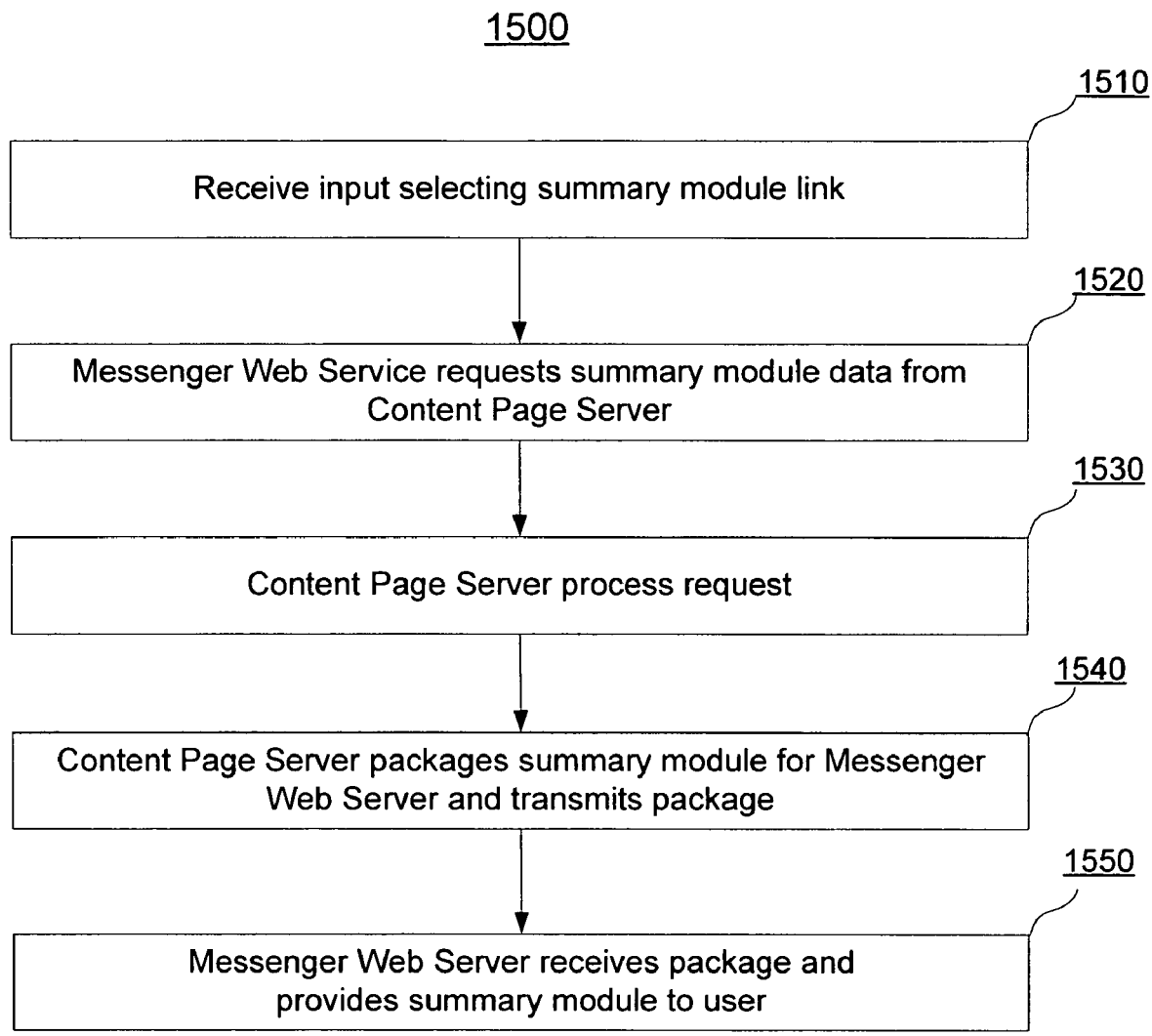
FIG. 15 illustrates one embodiment of a method for providing a summary module in a network browser.

Once the visual indicators are provided in the network browser, a user can select a visual indicator to view a summary module. In one embodiment, the summary modules can be implemented as an interface within a separate network browser. A method 1500 for providing a summary module by an IM interface provided in a network browser is illustrated in FIG. 15. Method 1500 begins at step 1510 wherein input is received selecting a visual indicator. In one embodiment, the visual indicator is a link to a summary module page on a network. At step 1520, messenger web service 860 requests summary module data from content page server 810. The summary module data request is received by content page server 810 and processed at step 1530. In one embodiment, the request is processed as discussed with respect to steps 1325 through 1360 of FIG. 13. After storage receives the summary module data, the data is packaged for the messenger web server and transmitted at step 1540. The messenger web server receives the package and provides the summary module at step 1550. In one embodiment, the summary module data is packaged as HTML and allows for the summary module to be provided as a separate web page.

In one embodiment, a summary module can be provided through an email web service. Similar to the web messenger service discussed with reference to FIGS. 14 and 15, email web services are implemented through a web browser. Thus, the summary module could be provided in a separate browser alongside an email management interface or within an email management interface provided in a network browser. A method for providing a visual indicator and a summary module for an email web service is the same as that of methods 1400 and 15000, except that the web browser communicates with content page server 810 through an email server 872 rather than a messenger web service 860 and the messenger web server. Thus a summary module is implemented as a web site by the content page web service.

Figure 16:
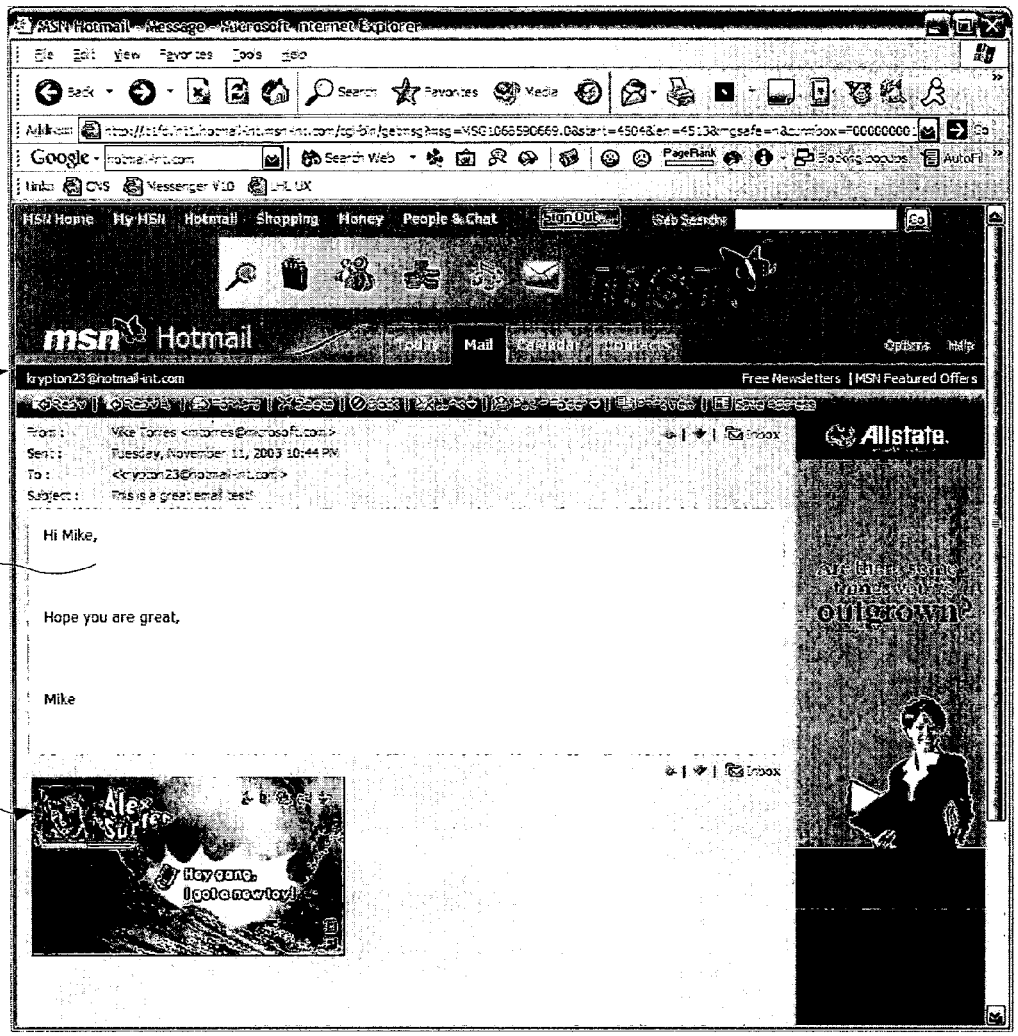
FIG. 16 illustrates a summary module integrated into an email generation interface provided by a network browser.
Figure 17:
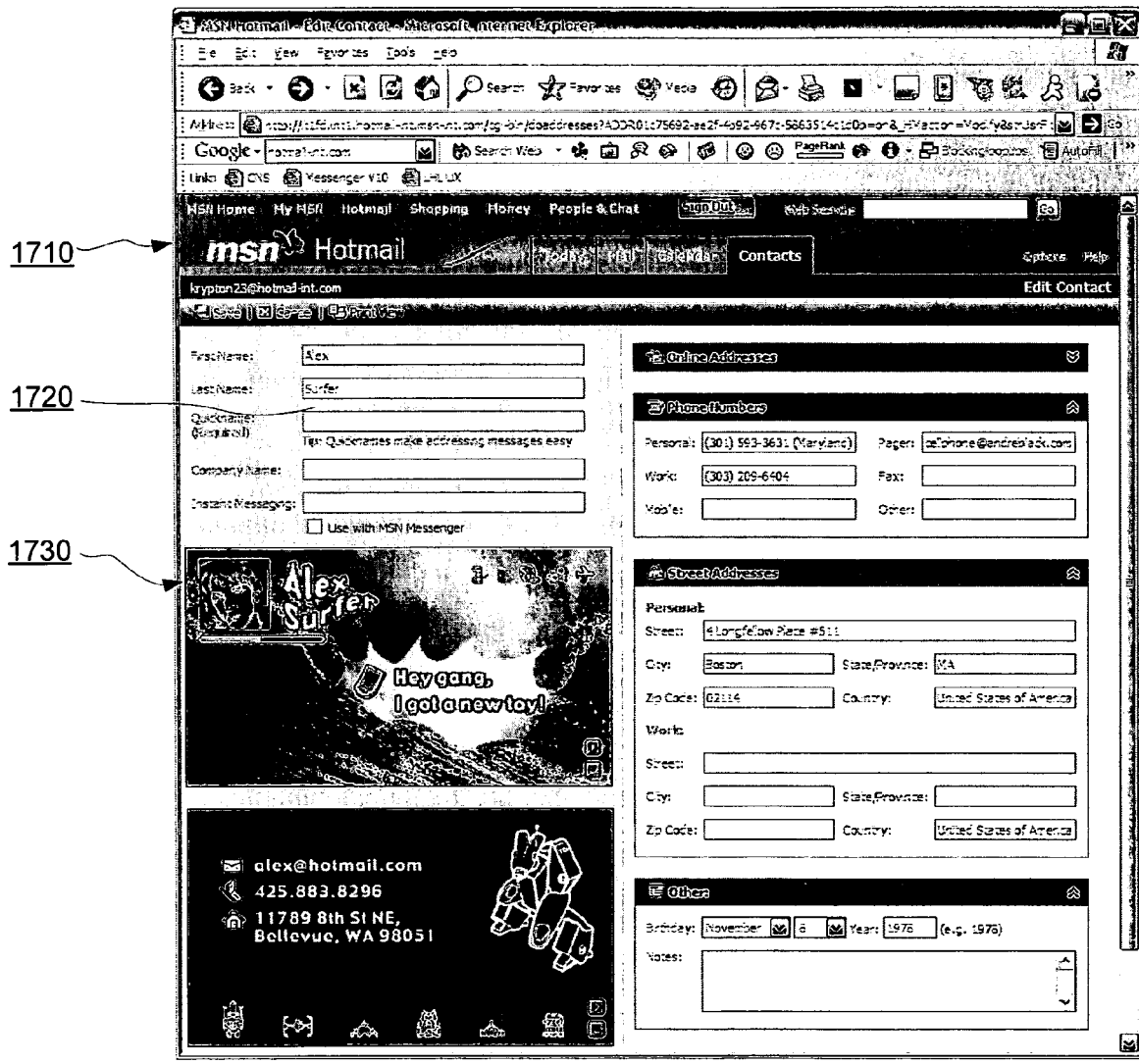
FIG. 17 illustrates a summary module integrated into a contact management interface provided by a network browser.
Figure 18:
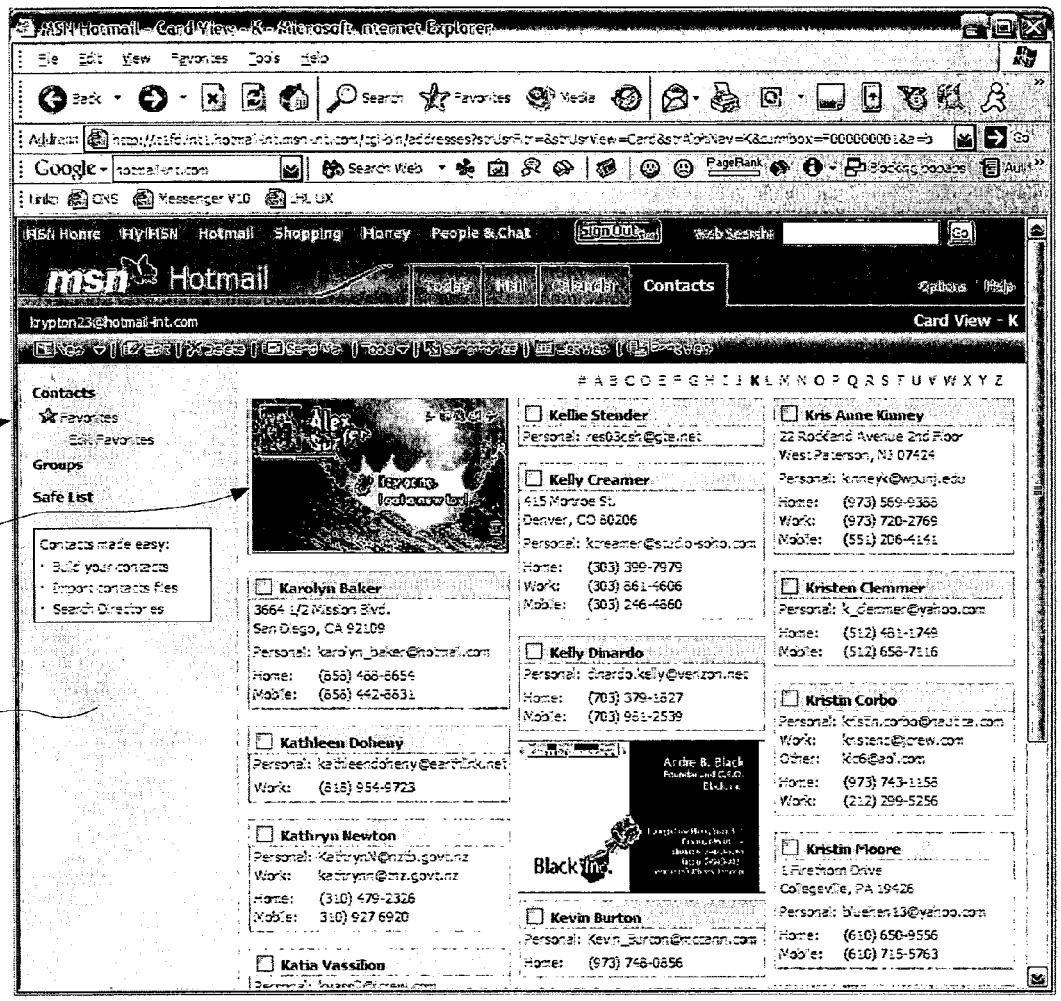
FIG. 18 illustrates a summary module integrated into an contact list interface provided by a network browser.

FIGS. 16-18 illustrate examples of providing a summary module in an email management interface provided in network browser, for example a web browser. FIG. 16 includes network browser 1610, email interface page 1620 and summary module 1630. The email interface page 1620 allows a user to generate an email. The summary module 1630 is provided as a signature in the email generated by the user. FIG. 17 includes network browser 1710, user contact page 1720 and summary module 1730. The user contact page 1720 allows a user to view and configure a contacts. The summary module 1730 is provided as part of the contact that can be configured by the user. FIG. 18 includes network browser 1810, contact list page 1820 and summary module 1830. The contact list page 1820 allows a user to view and configure a list of contacts. The summary module 1830 is provided as a field for a particular contact.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for displaying a subset of components contained on a web site to a user, wherein the web site is accessible via the Internet and is configured by a web site owner, comprising:

providing a messenger client interface to a user upon the user logging into an instant messaging system, wherein the messenger client interface displays a messenger contact list of contacts associated with the user and provides an indicator proximate each contact in the messenger contact list that is associated with a web site;

receiving a request from the user to view a contact's web site, wherein the contact's web site contains multiple web site components;

determining whether the user is included on a permission list associated with the contact's web site, the permission list stored in an address book clearing house;

if the user is included on the permission list, retrieving a subset of the multiple web site components from the contact's web site based on the permission list; and displaying the subset of the multiple web site components to the user for presentation to the user in a summary module window.

2. The method of claim 1, wherein:
the permission list includes one or more contacts selected by an owner of the web site.

3. The method of claim 1, wherein:
each of the multiple web site components includes web site data and is associated with a filter parameter, wherein the filter parameter indicates how the web site data from the component shall be displayed in the summary module window; and
said step of retrieving a subset of the components includes retrieving web site data within a component based on the filter parameter.

4. The method of claim 3, wherein:
the web site data includes data indicating when the contact's web site was last modified.

5. The method of claim 3, wherein:
the web site data includes data identifying the permission list.

6. The method of claim 3, wherein:
the web site data including one or more data elements, retrieving a subset of the web site data including:
retrieving a link to the network location of one or more of the data elements.

7. The method of claim 1, further comprising:
packaging the subset of the multiple web site components in a format having instructions to display the summary module window in a network browser.

8. The method of claim 1, further comprising:
packaging the subset of the multiple web site components in a Simple Object Access Protocol response.

9. The method as recited in claim 1, wherein the step of receiving a request from the user comprises the step of:
selecting an indicator adjacent a contact in the messenger contact list.

10. The method as recited in claim 1, wherein the summary module window provides a portal to the contact's web site.

11. A method for viewing a summary of the content available on a web site that is accessible via the Internet and has been configured by a web site owner, comprising:
receiving input from a user to view a web site associated with one of a plurality of contacts displayed in a messenger contact list, wherein the input from the user is received upon the user selecting an indicator displayed adjacent a contact designating that the contact has a web site having content, wherein the input from the user is received by a messenger client;
sending a summary module data request from the messenger client to a data storage device, the summary module data request includes permission data, the permission data associated with a permission list generated by the contact associated with the web site;
receiving a summary module data response from the data storage device in response to the summary module data request, the summary module data response including a subset of the content available on the contact's web site, wherein the subset of content has been predefined by the contact associated with the web site; and
providing a summary module window to the user, wherein the summary module window provides a portal to the contact's web site and displays the predefined subset of content.

12. The method of claim 11, wherein:
the summary module data request includes version information regarding a previous summary module data request associated with the summary module window.

13. The method of claim 12, wherein:
the content includes one or more components, each component having web site data, the version information indicating the previous summary module data request associated with each component.

14. The method of claim 11, wherein:
receiving the summary module data response includes:
receiving instructions to provide an interface within a network browser.

15. The method of claim 11, wherein:
sending a summary module data request includes:
generating a list of web site content having web site page data; and
sending the list of web site content, the summary module data in the summary module data response corresponding to the web site content.

16. The method of claim 11 wherein:
receiving the summary module data response includes:
receiving the content in a mark-up language stream.

17. The method of claim 11 wherein:
providing the summary module window includes:
populating the summary module window with the subset of content.

18. The method of claim 11 wherein:
providing the summary module window includes:
providing the summary module window in a network browser.

19. A system for providing a summary module associated with a web page, comprising:
a messenger interface displaying a plurality of contacts in a messenger contact list, wherein the messenger contact list displays a contact presence indicator adjacent each contact in the contact list only if the contact has a web page containing viewable content;
a data storage device containing a permission list associated with each contact's web page; and
a server connected to the web page and the data storage device, the server configured to receive input from a user requesting to view a contact's web page, retrieve a subset of the content from the web page based on the permission list associated with the web page and display the subset of content to the user via a summary module window.

20. The system of claim 19, wherein:
the subset of content comprises one or more components, each of the one or more components including web page data and a filter indicator, the web page data determined by each of the one or more filter indicators.

21. The system of claim 20, wherein:
the one or more filter indicators is configured by the contact associated with the web page.

22. The system of claim 19, wherein:
the permission list contains a permission level associated with each user in the permission list.

23. The system of claim 22, wherein:
the subset of content includes a permission list identifier associated with the permission list.

24. The system of claim 19, wherein:
the input received by the server from the user is in response to the user selecting a contact presence indicator adjacent a contact in the messenger contact list.

25. The system of claim 24, wherein:
the subset of content is specified in the user request.

26. The system of claim 24, wherein:
the server receives the input from the messenger interface.

27. The system of claim 19, wherein:
the subset of content is formatted to be displayed in a network browser.

28. The system of claim 19, wherein the subset of content is formatted in a mark-up language.

29. One or more processor readable storage devices having processor readable code embodied on said processor readable storage devices, said processor readable code for programming one or more processors to perform a method comprising:
providing a messenger interface displaying a plurality of contacts in a messenger contact list to a user, wherein the messenger contact list displays a graphical indicator adjacent each contact in the contact list that has a web site containing viewable content;
receiving input from the user to view a contact's web page, wherein the input is based on the user selecting the graphical indicator adjacent the contact displayed in the messenger contact list;
identifying the user on a permission list associated with the contact's web site;
determining a subset of the content on the web site to display in a summary module interface; and
providing the subset of the content to the user via the summary module interface.

30. One or more processor readable storage devices according to claim 29, wherein the method further comprising:
formatting the subset of the content.

31. One or more processor readable storage devices according to claim 29, wherein:
the permission list is generated by the contact associated with the web site.

32. The one or more processor readable storage devices according to claim 29, wherein:
the web site includes one or more filter parameters;
said providing the subset of content includes displaying a portion of each piece of content in the summary module interface based on the value of the filter parameters.

* * * * *

UNITED STATES PATENT AND TRADEMARK OFFICE
CERTIFICATE OF CORRECTION

PATENT NO.       : 7,620,996 B2
APPLICATION NO.  : 10/978993
DATED            : November 17, 2009
INVENTOR(S)      : Torres et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Twenty-sixth Day of October, 2010

David J. Kappos
*Director of the United States Patent and Trademark Office*